(12) United States Patent
Vujcic

(10) Patent No.: US 8,406,201 B2
(45) Date of Patent: Mar. 26, 2013

(54) METHODS AND PROCEDURES TO ALLOCATE UE DEDICATED SIGNATURES

(75) Inventor: Dragan Vujcic, Orsay (FR)

(73) Assignee: LG Electronics Inc., Seoul (KR)

( * ) Notice: Subject to any disclaimer, the term of this patent is extended or adjusted under 35 U.S.C. 154(b) by 698 days.

(21) Appl. No.: 12/532,140

(22) PCT Filed: Mar. 17, 2008

(86) PCT No.: PCT/KR2008/001494
§ 371 (c)(1),
(2), (4) Date: Sep. 18, 2009

(87) PCT Pub. No.: WO2008/114983
PCT Pub. Date: Sep. 25, 2008

(65) Prior Publication Data
US 2010/0105405 A1  Apr. 29, 2010

Related U.S. Application Data

(60) Provisional application No. 60/895,705, filed on Mar. 19, 2007.

(51) Int. Cl.
*H04B 7/216* (2006.01)
*H04W 72/00* (2009.01)
(52) U.S. Cl. .................................. 370/335; 455/450
(58) Field of Classification Search .......... 370/335–337; 455/450–451, 452.1
See application file for complete search history.

(56) References Cited

U.S. PATENT DOCUMENTS 6,031,832 A * 2/2000 Turina ........................ 370/348
2005/0053029 A1  3/2005 Lee et al.

FOREIGN PATENT DOCUMENTS

EP  0993211  4/2000
EP  1635511  3/2006

OTHER PUBLICATIONS ("Zadoff-Chu sequence allocation on RACH for complexity reduction"; 3GPP TSG-RAN WG1 Meeting #47bis, Sorrento, Italy; Jan. 15-19, 2007; Panasonic, NTT DoCoMo).*
("Configurable Cyclic Shift for Non-Synchronized Random Access Preamble"; 3GPP TSG RAN WG1 #46bis; Seoul, South Korea; Oct. 9-13, 2006; Texas Instruments).*
LG Electronics, "RACH Sequence Extension Methods for Large Cell Deployment," R1-062306, 3GPP TSG RAN1 LTE WG1 Meeting #46, Aug. 2006, XP-050102831.
Nokia, "Restricted Sets of RACH Preamble Signatures for Environments with High Doppler Shifts," R1-070377, 3GPP TSG RAN WG1 #47bis, Jan. 2007, XP-050104409.
Panasonic, "Random Access Preamble Signatures Usage," R2-070891, 3GPP TSG RAN WG2 #57, Feb. 2007, XP-050133909.
Panasonic, "RACH Preamble Performance Evaluation with Frequency Offset for E-UTRA," R1-063181, GPP TSG-RAN WG1, Nov. 2006, XP-050103636.
LG Electronics, "Use of Dedicated RACH Signatures," R2-070687, 3GPP TSG-RAN WG2, Feb. 2007, XP-050133725.

(Continued)

*Primary Examiner* — Ian N Moore
*Assistant Examiner* — Afshawn Towfighi
(74) *Attorney, Agent, or Firm* — Lee, Hong, Degerman, Kang & Waimey

(57) ABSTRACT

A mobile terminal random access procedure is provided for obtaining uplink time synchronization and access to a network by optimizing the allocation of cyclic shifted Zadoff-Chu sequences with Zero Correlation Zone (ZC-ZCZ) as part of dedicated signatures for contention-free uplink radio access channels (RACH).

6 Claims, 23 Drawing Sheets

OTHER PUBLICATIONS

Panasonic et al., "Zadoff-Chu Sequence Allocation on RACH for Complexity Reduction," R1-070189, 3GPP TSG-RAN WG1, Jan. 2007, XP-050104231.

B.M. Popovic et al., "Random Access Preambles for Evolved UTRA Cellular System," IEEE Ninth Annual International Symposium on Spread Spectrum Techniques and Applications, Aug. 2006, XP-031047607.

Nokia, "Non Contention Based HO," R2-070455, 3GPP TSG-RAN WG2, Feb. 2007, XP-050133526.

LG Electronics Inc., "Random Access Preamble Signatures Allocation," R1-072215, 3GPP TSG-RAN WG1, May 2007, XP-050105951.

Panasonic, "Random Access Preamble signatures usage", R2-070524, 3GPP TSG RAN WG2 #57, Feb. 2007, XP-008132895.

LG Electronics Inc, "Contention and Dedicated RACH signature allocation", R1-073058, 3GPP TSG RAN WG1 #49bis, Jun. 2007, XP-050106715.

* cited by examiner

METHODS AND PROCEDURES TO ALLOCATE UE DEDICATED SIGNATURES

CROSS-REFERENCE TO RELATED APPLICATIONS

This application is the national stage filing under 35 U.S.C. 371 of international application No. PCT/KR2008/001494, filed on Mar. 17, 2008, which claims the benefit of U.S. provisional application No. 60/895,705, filed on Mar. 19, 2007, the contents of which are all hereby incorporated by reference herein in their entirety.

TECHNICAL FIELD

The present invention is directed to a mobile terminal random access procedure for obtaining uplink time synchronization and access to a network and specifically to an apparatus and method that facilitates optimization for allocation of cyclic shifted Zadoff-Chu sequences with Zero Correlation Zone (ZC-ZCZ) as part of dedicated signatures for contention-free uplink radio access channels (RACH).

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the $G_S$ interface, to the gateway GPRS support node (GGSN) 9 via the $G_N$ interface, and to the home subscriber server (HSS) via the $G_R$ interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the $N_B$ interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources.

The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

ARB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

The "originating call" establishment cause indicates that the UE 1 wants to setup a connection, for example, a speech connection. The "terminating call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in "The GSM System for Mobile Communications" published by M. Mouly and M. B. Paut et, 1992. As the present invention is related to UMTS enhancement and evolution, the W-CDMA random access procedure is detailed herein. Although the present invention is explained in the context of UMTS evolution, the present invention is not so limited.

The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

TABLE I

Establishment Causes

Originating Conversational Call
Originating Streaming Call
Originating Interactive Call
Originating Background Call
Originating Subscribed traffic Call
Terminating Conversational Call
Terminating Streaming Call
Terminating Interactive Call
Terminating Background Call
Emergency Call
Inter-RAT cell re-selection
Inter-RAT cell change order
Registration
Detach
Originating High Priority Signaling
Originating Low Priority Signaling
Call re-establishment
Terminating High Priority Signaling
Terminating Low Priority Signaling The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

The main characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part The timing at which the UE 1 can send the preamble is divided by random access sub channels. A random access sub channel is a subset including the combination of all uplink access slots. There are 12 random access sub channels. A random access sub channel consists of the access slots indicated in Table II.

TABLE II

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table III lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

Each slot includes a data part and a control part that transmits control information, such as pilot bits and TFCI. The data part and the control part are transmitted in parallel. The 20 ms long message part consists of two consecutive message part radio frames. The data part consists of $10*2^k$ bits, where k=0, 1, 2, 3, which corresponds to a Spreading Factor (SF) of 256, 128, 64, 32. FIG. 9 illustrates the structure of the random access message part.

TABLE III

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | −1 | 1 | −1 | 1 | −1 | 1 | −1 | 1 | −1 | 1 | −1 | 1 | −1 | 1 | −1 |
| $P_2(n)$ | 1 | 1 | −1 | −1 | 1 | 1 | −1 | −1 | 1 | 1 | −1 | −1 | 1 | 1 | −1 | −1 |
| $P_3(n)$ | 1 | −1 | −1 | 1 | 1 | −1 | −1 | 1 | 1 | −1 | −1 | 1 | 1 | −1 | −1 | 1 |
| $P_4(n)$ | 1 | 1 | 1 | 1 | −1 | −1 | −1 | −1 | 1 | 1 | 1 | 1 | −1 | −1 | −1 | −1 |
| $P_5(n)$ | 1 | −1 | 1 | −1 | −1 | 1 | −1 | 1 | 1 | −1 | 1 | −1 | −1 | 1 | −1 | 1 |
| $P_6(n)$ | 1 | 1 | −1 | −1 | −1 | −1 | 1 | 1 | 1 | 1 | −1 | −1 | −1 | −1 | 1 | 1 |
| $P_7(n)$ | 1 | −1 | −1 | 1 | −1 | 1 | 1 | −1 | 1 | −1 | −1 | 1 | −1 | 1 | 1 | −1 |
| $P_8(n)$ | 1 | 1 | 1 | 1 | 1 | 1 | 1 | 1 | −1 | −1 | −1 | −1 | −1 | −1 | −1 | −1 |
| $P_9(n)$ | 1 | −1 | 1 | −1 | 1 | −1 | 1 | −1 | −1 | 1 | −1 | 1 | −1 | 1 | −1 | 1 |
| $P_{10}(n)$ | 1 | 1 | −1 | −1 | 1 | 1 | −1 | −1 | −1 | −1 | 1 | 1 | −1 | −1 | 1 | 1 |
| $P_{11}(n)$ | 1 | −1 | −1 | 1 | 1 | −1 | −1 | 1 | −1 | 1 | 1 | −1 | −1 | 1 | 1 | −1 |
| $P_{12}(n)$ | 1 | 1 | 1 | 1 | −1 | −1 | −1 | −1 | −1 | −1 | −1 | −1 | 1 | 1 | 1 | 1 |
| $P_{13}(n)$ | 1 | −1 | 1 | −1 | −1 | 1 | −1 | 1 | −1 | 1 | −1 | 1 | 1 | −1 | 1 | −1 |
| $P_{14}(n)$ | 1 | 1 | −1 | −1 | −1 | −1 | 1 | 1 | −1 | −1 | 1 | 1 | 1 | 1 | −1 | −1 |
| $P_{15}(n)$ | 1 | −1 | −1 | 1 | −1 | 1 | 1 | −1 | −1 | 1 | 1 | −1 | 1 | −1 | −1 | 1 |

The AICH consists of a repeated sequence of 15 consecutive access slots, each slot having a length of 40 bit intervals or 5120 chips. Each access slot includes two parts, an Acquisition Indicator (AI) part consisting of 32 real-valued signals, such as a0 . . . a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, −1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 must repeat the access attempt some time later.

All UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table IV lists the special AC and their allocation.

TABLE IV

| AC | Allocation |
|---|---|
| 15 | PLMN Staff |
| 14 | Emergency Services |
| 13 | Public Utilities (e.g. water/gas suppliers) |
| 12 | Security Services |
| 11 | |

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table V.

TABLE V

| AC | Applicability |
|---|---|
| 0-9 | Home and Visited PLMNs |
| 11 and 15 | Home PLMN only |
| 12, 13, 14 | Home PLMN and visited PLMNs of home country only |

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

The AC are mapped to ASC In the UMTS. There are eight different priority levels defined, specifically ASC 0 to ASC 7, with level 0 representing the highest priority.

Access Classes shall only be applied at initial access, such as when sending an RRC Connection Request message. A mapping between AC and ASC shall be indicated by the information element "AC-to-ASC mapping" in System Information Block type 5. The correspondence between AC and ASC is indicated in Table VI.

TABLE VI

| AC | 0-9 | 10 | 11 | 12 | 13 | 14 | 15 |
|---|---|---|---|---|---|---|---|
| ASC | 1st IE | 2nd IE | 3rd IE | 4th IE | 5th IE | 6th IE | 7th IE |

In Table VI, "nth IE" designates an ASC number i in the range 0-7 to AC. The UE 1 behavior is unspecified if the ASC indicated by the "nth IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, $Pv \leq 1$, to attempt a transmission. Another important mechanism to control random access transmission is a load control mechanism that reduces the load of incoming traffic when the probability is high or when the radio resources are low. A flow chart of the control access procedure is illustrated in FIG. 11.

Existing specifications provide many RACH transmission control parameters that are stored and updated by the UE 1 based on system information broadcast by the UTRAN 2. These parameters are received from RRC (S10). The RACH transmission control parameters include PRACH, ASC, maximum number of preamble ramping cycles ($M_{max}$), range of backoff interval for timer ($T_{BO1}$) specified as a number of 10 ms transmission time intervals ($N_{BO1max}$) and ($N_{BO1min}$) and applicable when NACK is received on AICH.

When it is determined that there is data to transmit (S20), the UE 1 maps the assigned AC to an ASC (S30). A count value M is then set to zero (S40).

The count value M is then incremented by one (S50). The UE 1 determines if the count value M, which represents the maximum number of RACH transmission attempts, exceeds the maximum number of permitted RACH transmission attempts $M_{max}$ (S60).

The UE 1 treats the transmission as unsuccessful if M exceeds $M_{max}$. The UE 1 then indicates the unsuccessful transmission to a higher layer (S70)

However, the UE 1 proceeds with the RACH access procedure if M is less than or equal to $M_{max}$. The UE 1 updates the RACH transmission control parameters (S80). A 10 ms timer $T_2$ is set (S90) and the UE 1 determines whether to attempt transmission based on the persistence value $P_i$ associated with the ASC selected by the UE.

Specifically, a random number between 0 and 1, $R_i$, is generated (S100) and the random number is compared to the persistence value (5110). The UE 1 does not attempt transmission if $R_i$ is less than or equal to the persistence value $P_i$ and waits until the 10 ms timer $T_2$ expires (S120) before repeating the RACH access procedure by updating the RACH transmission control parameters (S80). However, the UE 1 attempts to transmit using assigned RACH resources (S130) if $R_i$ is less than or equal to the persistence value $P_i$.

The UE 1 determines whether the response from the network is an Acknowledgement (ACK), a Non-Acknowledgment (NACK) or no response (S150) after the access attempt is transmitted. The UE 1 begins message transmission (S160) if an ACK is received, thereby indicating receipt of the UE transmission by the UTRAN 2. The UE 1 does not transmit the message and repeats the RACH access procedure by incrementing the count value M (S50) if no response is received or a NACK is received, thereby indicating a failed receipt of the transmission by the network, for example, due to a collision.

The UE 1 only waits until the 10 ms timer $T_2$ expires (S170) before repeating the RACH access procedure if no response was received. However, the UE 1 waits until the 10 ms timer $T_2$ expires (S180) and also randomly generates a back off value $N_{BO1}$ associated with the PRACH assigned to the UE and between $N_{BO1max}$ and $N_{BO1min}$ and waits an additional back off interval $T_{BO1}$ that is equal to 10 ms multiplied by the back off value $N_{BO1}$ (S190) before repeating the RACH access procedure if a NACK was received.

The physical layer (L1) random access procedure is initiated upon request from the MAC sub layer (L2). The physical layer receives information from a higher layer, specifically the RRC, before the physical random-access procedure is initiated and receives information from a higher layer, specifically the MAC, at each initiation of the physical random access procedure. The information is indicated in Table VII. The physical layer random-access procedure is illustrated in FIG. 12.

As illustrated in FIG. 12, one access slot in the random access subchannel that can be used for the given ASC is randomly selected from access slots that can be used in the next full access slot sets (S200). One access slot is randomly chosen from access slots that can be used in the next full access slot sets if there are no access slots available. One signature is then randomly selected from the set of available signatures within the given ASC (S210).

The preamble retransmission counter is set at Preamble Retrans Max (S220), which is the maximum number of preamble retransmission attempts. The preamble transmission power is set at Preamble Initial Power (S230), which is the initial transmission power of the preamble. The preamble is then transmitted according to the chosen uplink access slot, signature and set transmission power (S240).

The UE 1 then determines whether the UTRAN 2 detected the preamble (S250). No random access message is transmitted if a NACK is detected in the downlink access slot corresponding to the selected uplink access slot. A random access message is transmitted if an ACK is detected in the downlink access slot corresponding to the selected uplink access slot. The preamble is retransmitted if no response, specifically neither an ACK nor a NACK for the selected signature, is detected in the downlink access slot corresponding to the selected uplink access slot.

When no response is received, the next available access slot is selected from the random access subchannel within the given ASC (S260), a new signature is randomly selected from the available signatures within the given ASC (S270), the preamble transmission power is increased by the step width of the power ramping (Power Ramp Step) (S280) and the preamble retransmission counter is reduced by 1 (S290). The UE 1 then determines if the maximum number of retransmissions have been attempted (S300). This preamble re-transmission procedure is repeated for as long as the preamble retransmission counter exceeds 0 and no response is received. The MAC is informed that no ACK was received on AICH (S310) and the physical layer random access procedure is terminated once the retransmission counter reaches 0.

TABLE VII

Information Related to Physical Random-Access Procedure

| Before Initiation of Procedure | Upon Initiating Procedure |
|---|---|
| Preamble scrambling code. | Transport Format for PRACH message part. |
| Message length in time (10 or 20 ms) | ASC of the PRACH transmission |
| AICH_Transmission_Timing parameter (0 or 1) | Data to be transmitted (Transport Block Set) |
| Set of available signatures and set of available RACH sub-channels for each Access Service Class (ASC). | |
| Power-ramping factor Power Ramp Step (integer > 0) | |
| Preamble Retrans Max parameter (integer > 0) | |
| Initial preamble power (Preamble_Initial_Power) | |
| Power offset in dB between power of the last transmitted preamble and power of the control part of the random-access message ($P_{p-m} = P_{message-control} - P_{preamble}$ measured) | |
| Set of Transport Format parameters (including power offset between the data part and the control part of the random-access message for each Transport Format) | |

If an ACK is received, the transmission power of the control channel of the random access message is set at a level higher than the transmission power of the last preamble transmitted according to a power offset (S320) and the random access message is transmitted 3 or 4 uplink access slots after the uplink access slot of the last transmitted preamble depending on the AICH transmission timing parameter (S330). The higher layer is then informed of the receipt of the ACK and transmission of the random access message (S340) and the physical layer random access procedure is terminated.

If a NACK is received, no random access message is transmitted and no re-transmission of the preamble is performed. The MAC is informed that a NACK was received (S350) and the physical layer random access procedure is terminated.

FIG. 13 illustrates a signaling establishment procedure between a UE 1 and UTRAN 2. As illustrated in FIG. 13, the RRC Connection Request message is transmitted once the PRACH power control preambles have been acknowledged (S400). The RRC Connection Request message includes a reason for requesting the connection.

The UTRAN 2 determines which resources to reserve and performs synchronization and signaling establishment among radio network nodes, such as a NodeB 5 and serving RNC 4, depending on the request reason (S410). The UTRAN 2 then transmits the Connection Setup message to the UE 1, thereby conveying information about radio resource to use (S420).

The UE 1 confirms connection establishment by sending the Connection Setup Complete message to the UTRAN 2 (S430). The UE 1 transmits the Initial Direct Transfer message to the UTRAN 2 once the connection has been established (S440). The Initial Direct Transfer message includes information such as the UE identity, UE current location and the kind of transaction requested.

Authentication is then performed between the UE 1 and UTRAN 2 and security mode communication is established (S450). The actual set up information is delivered to the UTRAN 2 from the UE 1 via the Call Control Setup message (S460). The Call Control Setup message identifies the transaction and indicates the QoS requirements.

The UTRAN 2 initiates activities for radio bearer allocation by determining if there are sufficient resources available to satisfy the requested QoS and transmits the Call Control Complete message to the UE 1 (S470). The radio bearer is allocated according to the request if there are sufficient resources available. The UTRAN 2 may select either to continue allocation with a lowered QoS value, queue the request until sufficient radio resources become available or reject the call request if sufficient resources are not presently available.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB in the LTE system. The following is the overview of the current LTE study assumption for RACH.

The random access procedure is classified into two categories; non-synchronized random access and synchronized random access. Only the non-synchronized random access procedure is considered herein.

Non-synchronized access is used when the uplink from a UE 1 has not been time synchronized or when the UE uplink loses synchronization. Non-synchronized access allows the UTRAN 2 to estimate and adjust the UE 1 transmission timing if necessary. Therefore the non-synchronized random access preamble is used for at least time alignment and signature detection.

FIG. 14 illustrates a random access burst. The message payload may include any additional associated signaling information, such as a random ID, Pathloss/Channel Quality indicator (CQI), or access purpose. A message payload up to 6 bits is transmitted in the random access burst along with the preamble as illustrated in FIG. 14.

A UE 1 randomly selects a signature from a group of signatures to distinguish between different UEs that attempt an access simultaneously. The preamble must have good auto-correlation properties in order for the UTRAN 2 to obtain an accurate timing estimate.

Additionally, different preambles should have good cross-correlation properties in order for the UTRAN 2 to distinguish between simultaneous access attempts for different UEs 1 using different signatures. A constant amplitude zero auto-correlation (CAZAC) sequence is used as a preamble signature sequence to achieve good detection probability.

Layer 1 shall receive the information listed in Table VIII from the higher layers prior to initiation of the non-synchronized physical random access procedure. The information is transmitted as part of the System Information from higher layers.

TABLE VIII

Information received from higher layers prior to initiation of
the non-synchronized physical random access procedure
Random access channel parameters (number, frequency position,
time period, and timing offset)
Preamble format for the cell
Number of root ZC sequences and sequence indices
Preamble mapping to implicit message (set of cause values, TABLE VIII-continued CQI quantization parameters, signature mapping)
Power ramping step size (note 0 dB step size is allowed)
Maximum number of preamble retransmissions FIG. 15 illustrates a call flow diagram for a non-synchronized physical random access procedure. As illustrated in FIG. 15, the physical layer (L1) random access procedure encompasses successful transmission of the random access preamble (message 1) and the random access response (message 2). The remaining messages are scheduled for transmission by the higher layer on the shared data channel and thus are not considered part of the L1 random access procedure. A random access channel is a 1.08 MHz portion of a subframe or set of consecutive subframes reserved for random access preamble transmissions.

A random access channel is randomly selected from the available non-synchronized random access channels and a preamble sequence is then randomly selected from the available preamble set based on the message to be transmitted. The random access procedure ensures that each of the allowed selections is chosen with equal probability.

The initial preamble transmission power level, which is set by the MAC, is determined using an open loop power control procedure. The transmission counter is set to the maximum number of preamble retransmissions.

A Random Access Preamble (message 1) is then transmitted using the selected random access channel, preamble sequence, and preamble transmission power. The L1 status "ACK on non-synchronized random access received" is reported to the higher layers, such as the MAC, and the physical random access procedure is terminated if a Random Access Response (message 2) corresponding to the transmitted preamble sequence (message 1) is detected. Another random access channel and preamble are randomly selected if no Random Access Response (message 2) corresponding to the transmitted preamble sequence (message 1) is detected.

Preamble retransmission occurs as long as the maximum number of retransmissions have not been reached. The L1 status "no acknowledgment on non-synchronized random access" is reported to the higher layers, such as the MAC, and the physical random access procedure is terminated if the maximum number of retransmissions has been reached.

FIG. 16 illustrates the architecture of an LTE (Long Term Evolution) system. One or more access Gateways (aGW) 15 are present. An aGW 15 is connected to another Node (not shown) that allows access to the Internet and/or other networks, such as GSM, UMTS, and WLAN.

The 3G LTE requires reduced cost per bit, increased service availability, flexible use of a frequency band, a simple structure, an open interface, and adequate power consumption of a terminal as an upper-level requirement. Generally, The UTRAN 2 corresponds to the E-UTRAN (Evolved-UTRAN), with the NodeB 5 and/or RNC 4 corresponding to e-NodeB (eNB) 20 in the LTE system.

The LTE system random access procedure can be classified into two categories. One category is contention-based RACH, where the UE 1 selects the signature, and the other category is contention-free RACH, where the eNB 20 designates the signature. The RACH preamble sequence is designed based on Zadoff-Chu sequences with Zero Correlation Zone (ZC-ZCZ) for both contention-based and contention-free procedures.

The contention-based RACH procedure is used for initial access when a UE 1 uplink must obtain time synchronization in order to access the eNB 20. The UE 1 randomly chooses one signature from among available signatures provided by the eNB 20. Contention occurs because the signature selection is random and, therefore, there is a probability that two or more UEs 1 may choose the same signature and transmit their random access within the same time/frequency resources.

The RACH procedure is contention-free when signature allocation is not random, but is instead dedicated to specific a UE 1, which avoids collisions. The contention-free RACH procedure may only be used by a UE 1 that has already established connection with eNB 20 for a purpose related to UE detection and feedback, such as handover, uplink synchronization maintenance, scheduling request and other possible purposes.

A RACH signature structure based on Zadoff-Chu sequences with Zero Correlation Zone (ZC-ZCZ) and different root sequence indices is utilized when the required number of signatures cannot be generated. The zero-correlation zone for the ZC-ZCZ sequence is generated using a cyclic shift version of the Zadoff-Chu (ZC) carrier sequence.

The excellent properties of ZC-ZCZ sequences disappear as the frequency error increases for high mobility UEs 1, such as on a high speed train, thereby inducing an overlap between shifted sequences and causing poor sequence detection poor that in some cases is impossible. Therefore, the cyclic shift is designed such that overlapping is avoided with the next shifted position when a high mobility UE 1 is supported within a cell, thereby resulting in the use of a restricted set of cyclic shifts. Furthermore, the number of ZC-ZCZ sequences is reduced inversely proportional to cell radius.

DISCLOSURE

[Technical Problem]

Because of the ZC-ZCZ restrictions related to cell size and frequency error and the decrease in the number of possible sequences as the cell size increases, with only a restricted set of sequences available when frequency error increases, the use of ZC-ZCZ sequences for the RACH procedure in conventional systems is limited.

[Technical Solution]

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

In one aspect of the present invention, a method of operating a wireless mobile terminal to request a random access connection with a base station is provided. The method includes receiving information comprising at least one signature root sequence index and a cyclic shift parameter, selecting one of a plurality of signature sequences, each of the plurality of signature sequences based on the at least one signature root sequence index and the cyclic shift parameter, wherein the selected signature sequence is used for requesting contention-based random access to the base station, receiving a dedicated signature identifier, the dedicated signature identifier representing a signature sequence unused in the contention-based random access and based on the signature root sequence index and the cyclic shift parameter and generating a preamble for requesting contention-free random access to the base station, the preamble comprising the selected signature sequence for the contention-based random access and a signature sequence based on the dedicated signature identifier.

It is contemplated that the dedicated signature identifier is received and the preamble for requesting contention-free random access is generated after a predetermined maximum number of signatures for contention-based random access are selected. It is further contemplated that generating the preamble for requesting contention-free random access comprises right-cyclic-shifting the dedicated signature according to the cyclic shift parameter.

It is contemplated that the method further includes generating a subsequent preamble for requesting contention-free random access by incrementally allocating a dedicated signature from a consecutive right-cyclic-shifted version of the same one of the at least one signature root sequence index. It is further contemplated that the method further includes generating a subsequent preamble for requesting contention-free random access by incrementally allocating a dedicated signature from a right-cyclic-shifted version of a different one of the at least one signature root sequence index if a predetermined number of cyclic shifts has been performed before a predetermined maximum number of dedicated signatures has been allocated. Preferably, a single one signature root sequence index is received and further comprising generating the plurality of signature sequences according to a predetermined maximum contention-based signatures, a predetermined maximum contention-free signatures and the cyclic shift parameter.

In another aspect of the present invention, a method of operating a wireless mobile terminal to request a random access connection with a base station is provided. The method includes receiving information comprising at least one signature root sequence index and a cyclic shift parameter, selecting one of a plurality of signature sequences, each of the plurality of signature sequences is based on the at least one signature root sequence index and the cyclic shift parameter, and using the selected signature sequence to request one of contention-based random access and contention-free random access to the base station, wherein the contention-based random access and the contention-free random access distinguished by at least one of time and frequency.

It is contemplated that the method further includes generating the plurality of signature sequences. It is further contemplated that the cyclic shift parameter is received in a broadcast from the base station. Preferably, the at least one signature root sequence index is received in a broadcast from the base station.

In another aspect of the present invention, a method of operating a wireless mobile terminal to request a random access connection with a base station is provided. The method includes receiving information comprising at least one signature root sequence index and a cyclic shift parameter, selecting one of a plurality of signature sequences, each of the plurality of signature sequences based on the at least one signature root sequence index and the cyclic shift parameter, wherein the selected signature sequence is used for requesting contention-based random access to the base station, receiving a dedicated signature identifier, the dedicated signature identifier representing a signature sequence based on the signature root sequence index and the cyclic shift parameter and generating a preamble for requesting contention-free random access to the base station, the preamble comprising the selected signature sequence for the contention-based random access and a signature sequence based on the dedicated signature identifier.

It is contemplated that the dedicated signature identifier is received and the preamble for requesting contention-free random access is generated after a predetermined maximum number of signatures for contention-based random access are selected. It is further contemplated that generating the preamble for requesting contention-free random access comprises right-cyclic-shifting the dedicated signature according to the cyclic shift parameter.

It is contemplated that the method further includes generating a subsequent preamble for requesting contention-free random access by incrementally allocating a dedicated signature from a consecutive right-cyclic-shifted version of the same one of the at least one signature root sequence index. It is further contemplated that the method further includes generating a subsequent preamble for requesting contention-free random access by incrementally allocating a dedicated signature from a right-cyclic-shifted version of a different one of the at least one signature root sequence index if a predetermined number of cyclic shifts has been performed before a predetermined maximum number of dedicated signatures has been allocated. Preferably, a single one signature root sequence index is received and further comprising generating the plurality of signature sequences according to a predetermined maximum contention-based signatures, a predetermined maximum contention-free signatures and the cyclic shift parameter.

In another aspect of the present invention, a method of operating a wireless mobile terminal to request a random access connection with a base station is provided. The method includes receiving information comprising at least one signature root sequence index and a cyclic shift parameter, selecting one of a plurality of signature sequences, each of the plurality of signature sequences based on the at least one signature root sequence index and the cyclic shift parameter and having a first length, generating a preamble comprising the selected signature sequence for requesting contention-based random access to the base station, receiving a dedicated signature identifier, the dedicated signature identifier representing a signature sequence having a second length different from the first length and generating a preamble for requesting contention-free random access to the base station, the preamble comprising a signature sequence based on the dedicated signature identifier with the signature sequence at least partly repeated.

It is contemplated that the dedicated signature identifier is received and the preamble for requesting contention-free random access is generated after a predetermined maximum number of signatures for contention-based random access are selected. It is further contemplated that generating the preamble for requesting contention-free random access comprises right-cyclic-shifting the dedicated signature according to the cyclic shift parameter.

It is contemplated that the method further includes generating a subsequent preamble for requesting contention-free random access by incrementally allocating a dedicated signature from a consecutive right-cyclic-shifted version of the same one of the at least one signature root sequence index. It is further contemplated that the method further includes generating a subsequent preamble for requesting contention-free random access by incrementally allocating a dedicated signature from a right-cyclic-shifted version of a different one of the at least one signature root sequence index if a predetermined number of cyclic shifts has been performed before a predetermined maximum number of dedicated signatures has been allocated.

It is contemplated that a single one signature root sequence index is received and further comprising generating the plurality of signature sequences according to a predetermined maximum contention-based signatures, a predetermined maximum contention-free signatures and the cyclic shift parameter. It is further contemplated that the method further includes receiving a parameter indicating at least one of the first length and the second length. Preferably, the method further includes receiving a parameter indicating a number of times to at least partly repeat the signature sequence.

In another aspect of the present invention, a method of operating a wireless mobile terminal to request a random access connection with a base station is provided. The method includes receiving information comprising at least one signature root sequence index and a cyclic shift parameter, selecting one of a plurality of signature sequences, each of the plurality of signature sequences based on the at least one signature root sequence index, the cyclic shift parameter and a first orthogonal code, generating a preamble comprising the selected signature sequence for requesting contention-based random access to the base station, receiving a dedicated signature identifier and generating a preamble for requesting contention-free random access to the base station, the preamble comprising a signature sequence based on the dedicated signature identifier and a second orthogonal code.

It is contemplated that the dedicated signature identifier is received and the preamble for requesting contention-free random access is generated after a predetermined maximum number of signatures for contention-based random access are selected. It is further contemplated that generating the preamble for requesting contention-free random access comprises right-cyclic-shifting the dedicated signature according to the cyclic shift parameter.

It is contemplated that the method further includes generating a subsequent preamble for requesting contention-free random access by incrementally allocating a dedicated signature from a consecutive right-cyclic-shifted version of the same one of the at least one signature root sequence index. It is further contemplated that the method further includes generating a subsequent preamble for requesting contention-free random access by incrementally allocating a dedicated signature from a right-cyclic-shifted version of a different one of the at least one signature root sequence index if a predetermined number of cyclic shifts has been performed before a predetermined maximum number of dedicated signatures has been allocated. Preferably, a single one signature root sequence index is received and further comprising generating the plurality of signature sequences according to a predetermined maximum contention-based signatures, a predetermined maximum contention-free signatures and the cyclic shift parameter.

In another aspect of the present invention, a mobile terminal for requesting a random access connection with a base station is provided. The mobile terminal includes a transmitting/receiving unit transmitting and receiving messages between the mobile terminal and the base station, a display unit displaying user interface information, an input unit receiving inputs from a user and a processing unit processing received information comprising at least one signature root sequence index and a cyclic shift parameter, selecting one of a plurality of signature sequences, processing a received dedicated signature identifier, and generating a preamble for requesting contention-free random access to the base station, wherein each of the plurality of signature sequences is based on the at least one signature root sequence index and the cyclic shift parameter, wherein the selected signature sequence is used for requesting contention-based random access to the base station, wherein the dedicated signature identifier represents a signature sequence unused in the contention-based random access and is based on the signature root sequence index and the cyclic shift parameter, and wherein the preamble comprises the selected signature sequence for the contention-based random access and a signature sequence based on the dedicated signature identifier.

In another aspect of the present invention, a mobile terminal for requesting a random access connection with a base station is provided. The mobile terminal includes a transmitting/receiving unit transmitting and receiving messages between the mobile terminal and the base station, a display unit displaying user interface information, an input unit receiving inputs from a user and a processing unit processing received information comprising at least one signature root sequence index and a cyclic shift parameter, selecting one of a plurality of signature sequences, and using the selected signature sequence to request one of contention-based random access and contention-free random access to the base station, wherein each of the plurality of signature sequences is based on the at least one signature root sequence index and the cyclic shift parameter, and wherein the contention-based random access and the contention-free random access are distinguished by at least one of time and frequency.

In another aspect of the present invention, a mobile terminal for requesting a random access connection with a base station is provided. The mobile terminal includes a transmitting/receiving unit transmitting and receiving messages between the mobile terminal and the base station, a display unit displaying user interface information, an input unit receiving inputs from a user and a processing unit processing received information comprising at least one signature root sequence index and a cyclic shift parameter, selecting one of a plurality of signature sequences, processing a received dedicated signature identifier, and generating a preamble for requesting contention-free random access to the base station, wherein each of the plurality of signature sequences is based on the at least one signature root sequence index and the cyclic shift parameter, wherein the selected signature sequence is used for requesting contention-based random access to the base station, wherein the dedicated signature identifier represents a signature sequence based on the signature root sequence index and the cyclic shift parameter, and wherein the preamble comprises the selected signature sequence for the contention-based random access and the signature sequence based on the dedicated signature identifier.

In another aspect of the present invention, a mobile terminal for requesting a random access connection with a base station is provided. The mobile terminal includes a transmitting/receiving unit transmitting and receiving messages between the mobile terminal and the base station, a display unit displaying user interface information, an input unit receiving inputs from a user and a processing unit processing received information comprising at least one signature root sequence index and a cyclic shift parameter, selecting one of a plurality of signature sequences, generating a preamble for requesting contention-based random access to the base station, processing a received dedicated signature identifier, and generating a preamble for requesting contention-free random access to the base station, wherein each of the plurality of signature sequences is based on the at least one signature root sequence index and the cyclic shift parameter and has a first length, wherein the preamble for requesting contention-based random access comprises the selected signature sequence, wherein the dedicated signature identifier represents a signature sequence having a second length different from the first length, and wherein the preamble for requesting contention-free random access comprises the signature sequence based on the dedicated signature identifier with the signature sequence at least partly repeated.

In another aspect of the present invention, a mobile terminal for requesting a random access connection with a base station is provided. The mobile terminal includes a transmitting/receiving unit transmitting and receiving messages between the mobile terminal and the base station, a display unit displaying user interface information, an input unit receiving inputs from a user and a processing unit processing received information comprising at least one signature root sequence index and a cyclic shift parameter, selecting one of a plurality of signature sequences, generating a preamble for requesting contention-based random access to the base station, processing a received dedicated signature identifier, and generating a preamble for requesting contention-free random access to the base station, wherein each of the plurality of signature sequences is based on the at least one signature root sequence index, the cyclic shift parameter and a first orthogonal code, wherein the preamble for requesting the contention-based random access comprises the selected signature sequence, and wherein the preamble for requesting the contention-free random access comprises a signature sequence based on the dedicated signature identifier and a second orthogonal code.

These and other embodiments will also become readily apparent to those skilled in the art from the following detailed description of the embodiments having reference to the attached figures, the invention not being limited to any particular embodiments disclosed.

[Advantageous Effects]

According to embodiments of the present invention, since the allocation of sequences can be optimized, the ZC-ZCZ sequences could be utilized easier.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE

The present invention is directed to optimization of the allocation of cyclic shifted Zadoff-Chu sequences with Zero Correlation Zone (ZC-ZCZ) as part of dedicated signatures for contention-free uplink radio access channels (RACH). Reference will now be made in detail to the preferred embodiments of the present invention, examples of which are illustrated in the accompanying drawings.

The RACH signature structure for an LTE system is based on Zadoff-Chu sequences with Zero Correlation Zone (ZC-ZCZ) and different root sequence indexes when the required number of signatures cannot be generated. The zero-correlation zone (ZCZ) is generated using the cyclic shift version of the Zadoff-Chu (ZC) carrier sequence.

The eNB 20 indicates a configuration of cyclic shifts and a starting root index. The UE 1 generates 64 signatures and randomly chooses one of the 64 signatures in a contention-based system.

The number of ZC-ZCZ sequences is reduced inversely proportional to cell radius. Therefore, additional ZCZ sequences from another root index are added when the number of ZCZ sequences is not sufficient.

Figure 1:
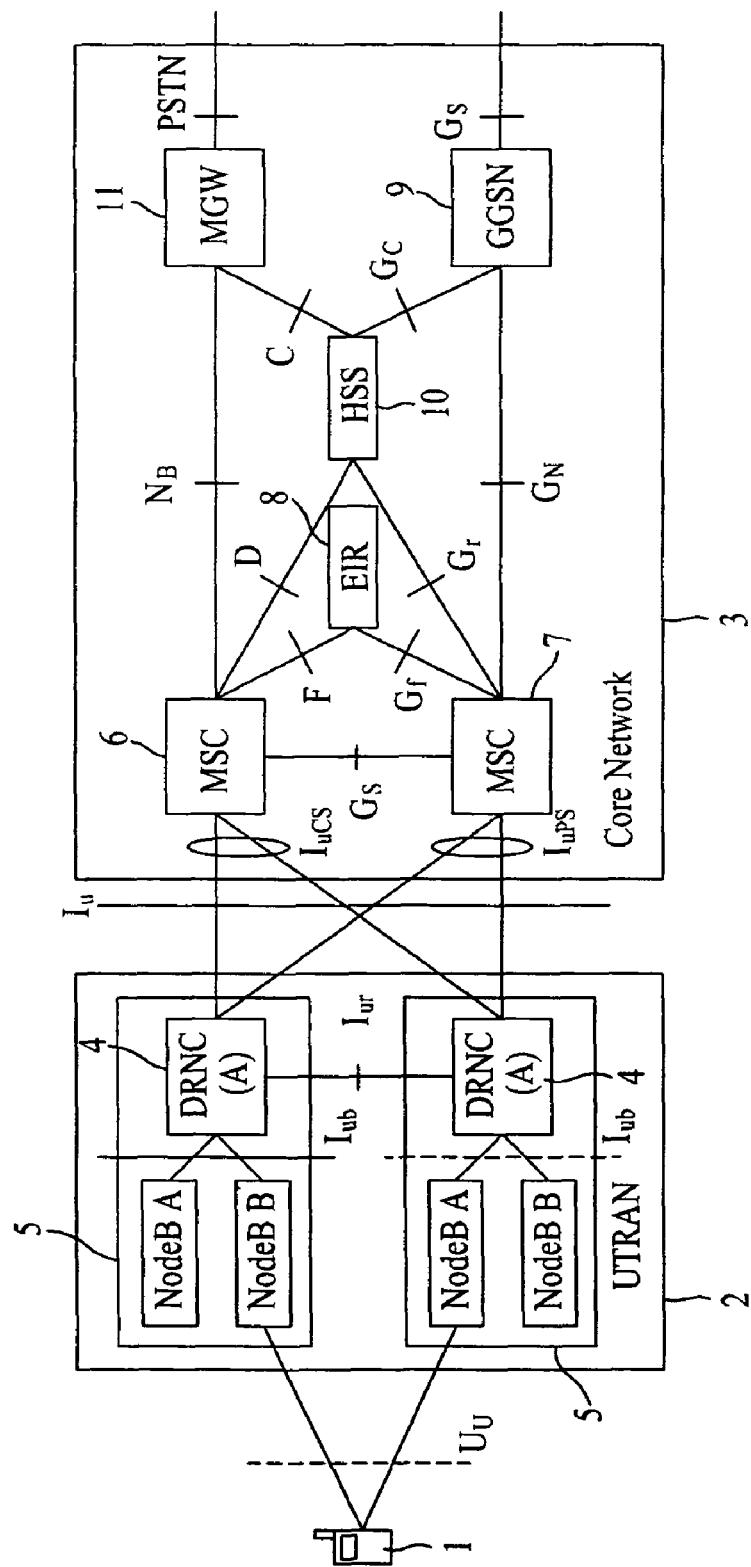
FIG. 1 illustrates an overview of a UMTS network.
Figure 2:
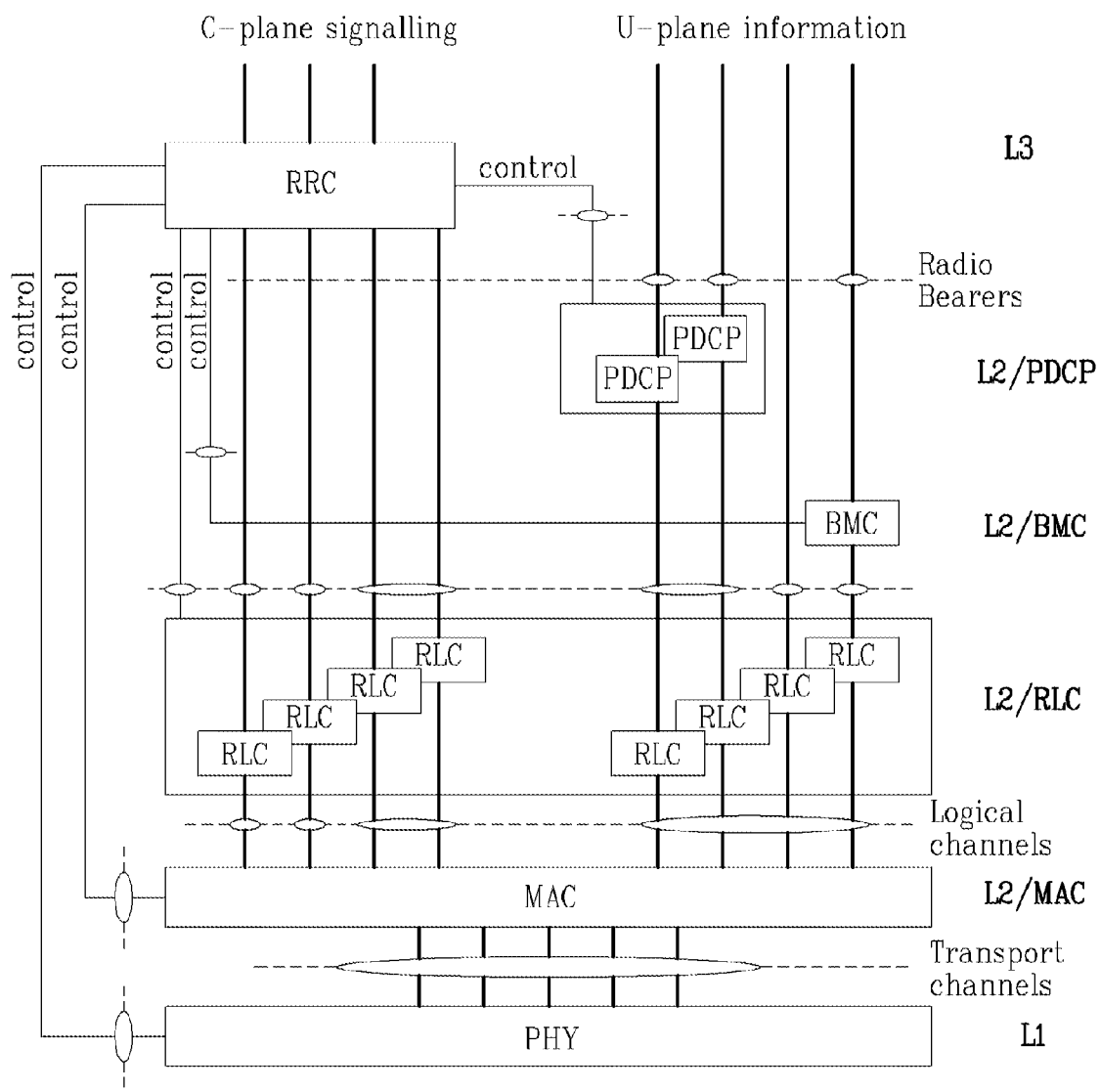
FIG. 2 illustrates a structure of a radio interface protocol between a UE and the UTRAN according to the 3GPP radio access network standards.
Figure 3:
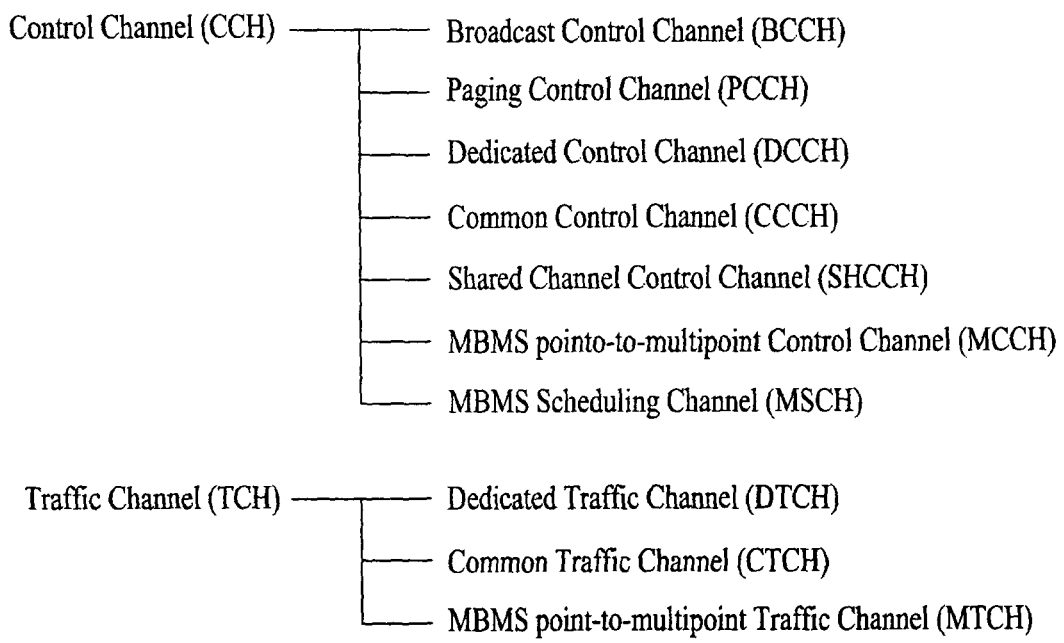
FIG. 3 illustrates the different logical channels.
Figure 4:
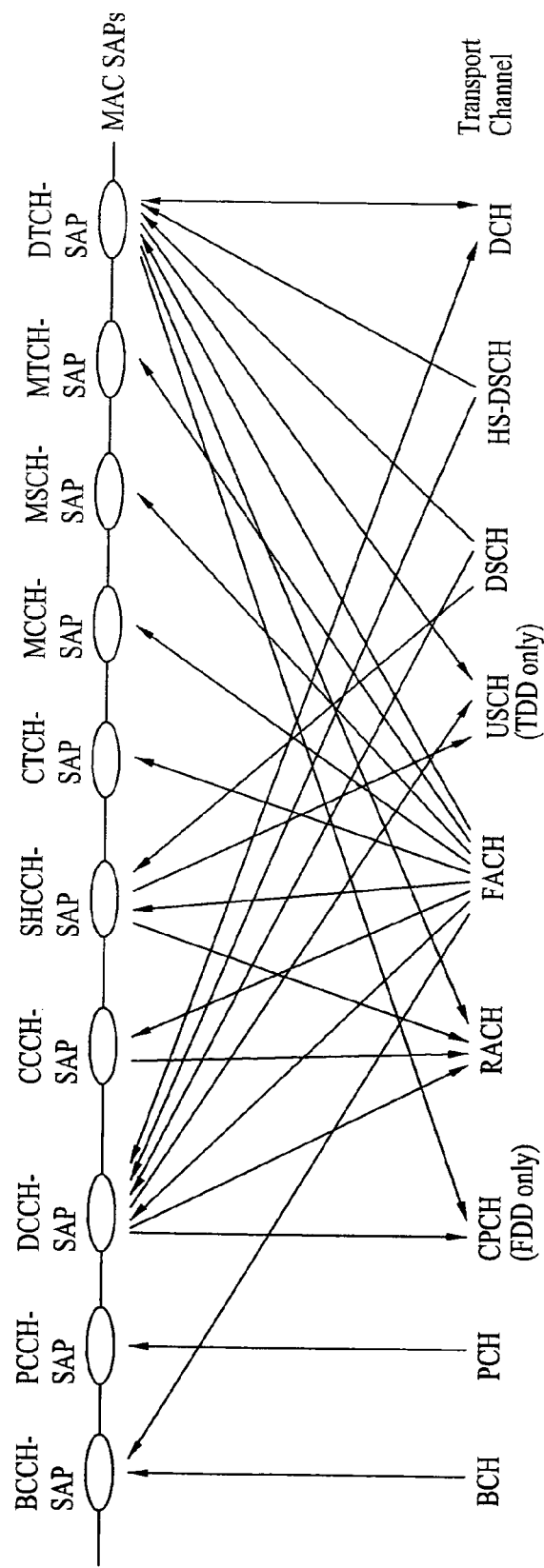
FIG. 4 illustrates logical channels mapped onto transport channels as seen from the UE side.
Figure 5:
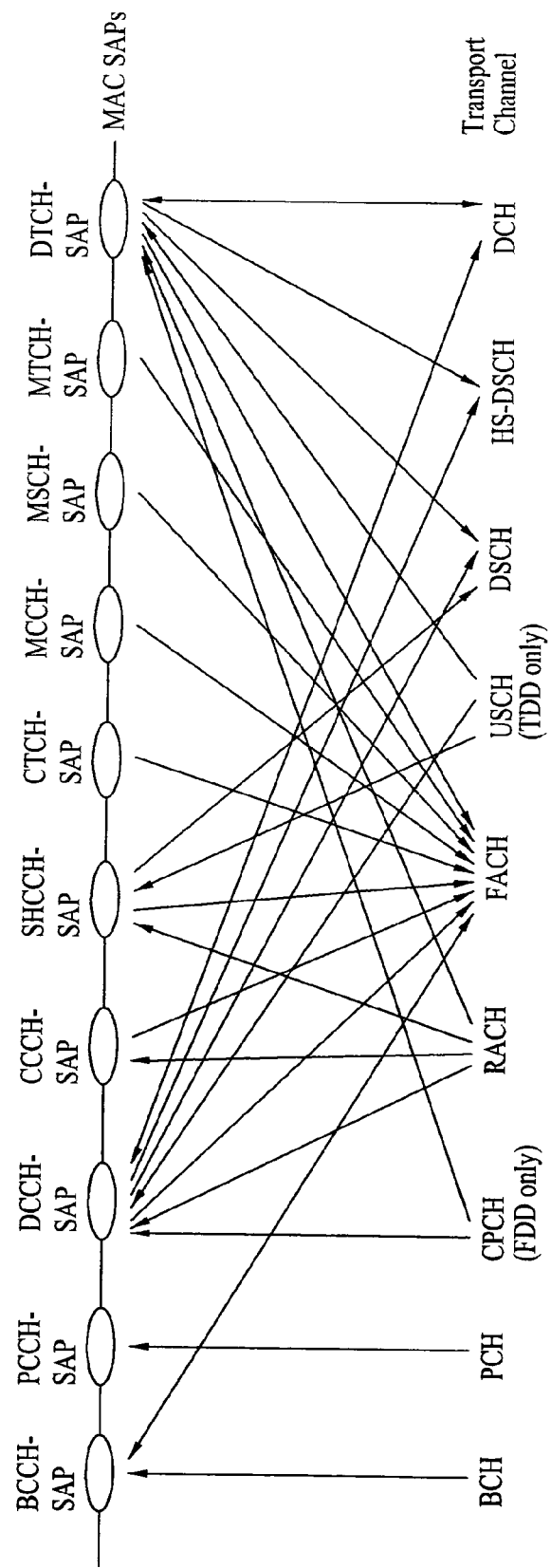
FIG. 5 illustrates logical channels mapped onto transport channels as seen from the UTRAN side.
Figure 6:
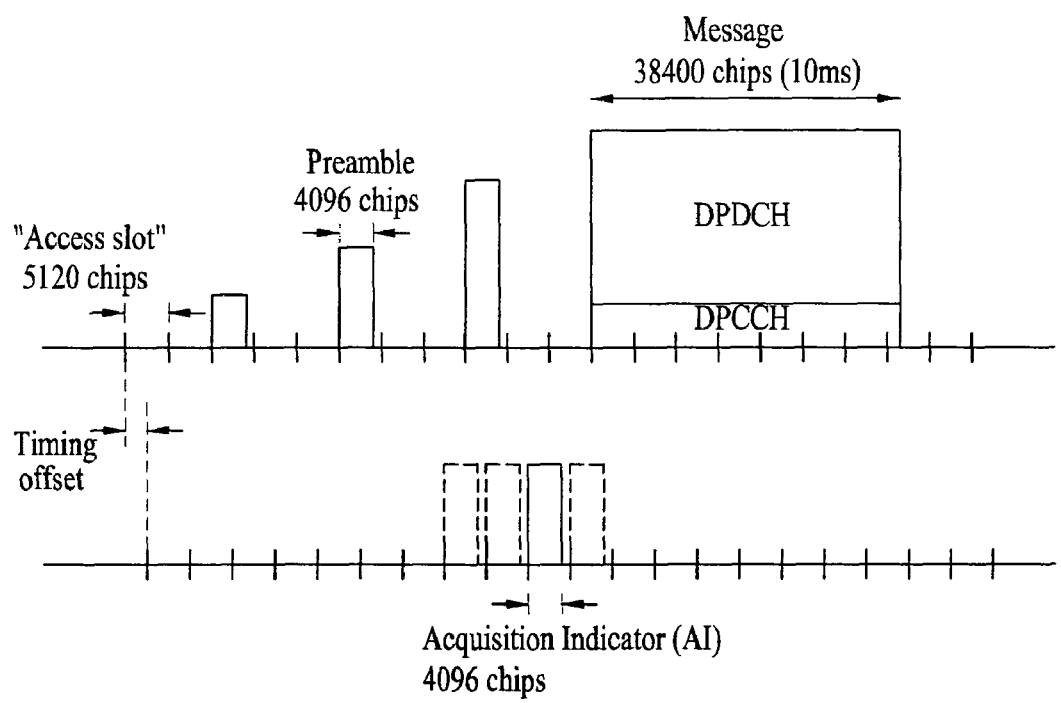
FIG. 6 illustrates a power ramping procedure.
Figure 7:
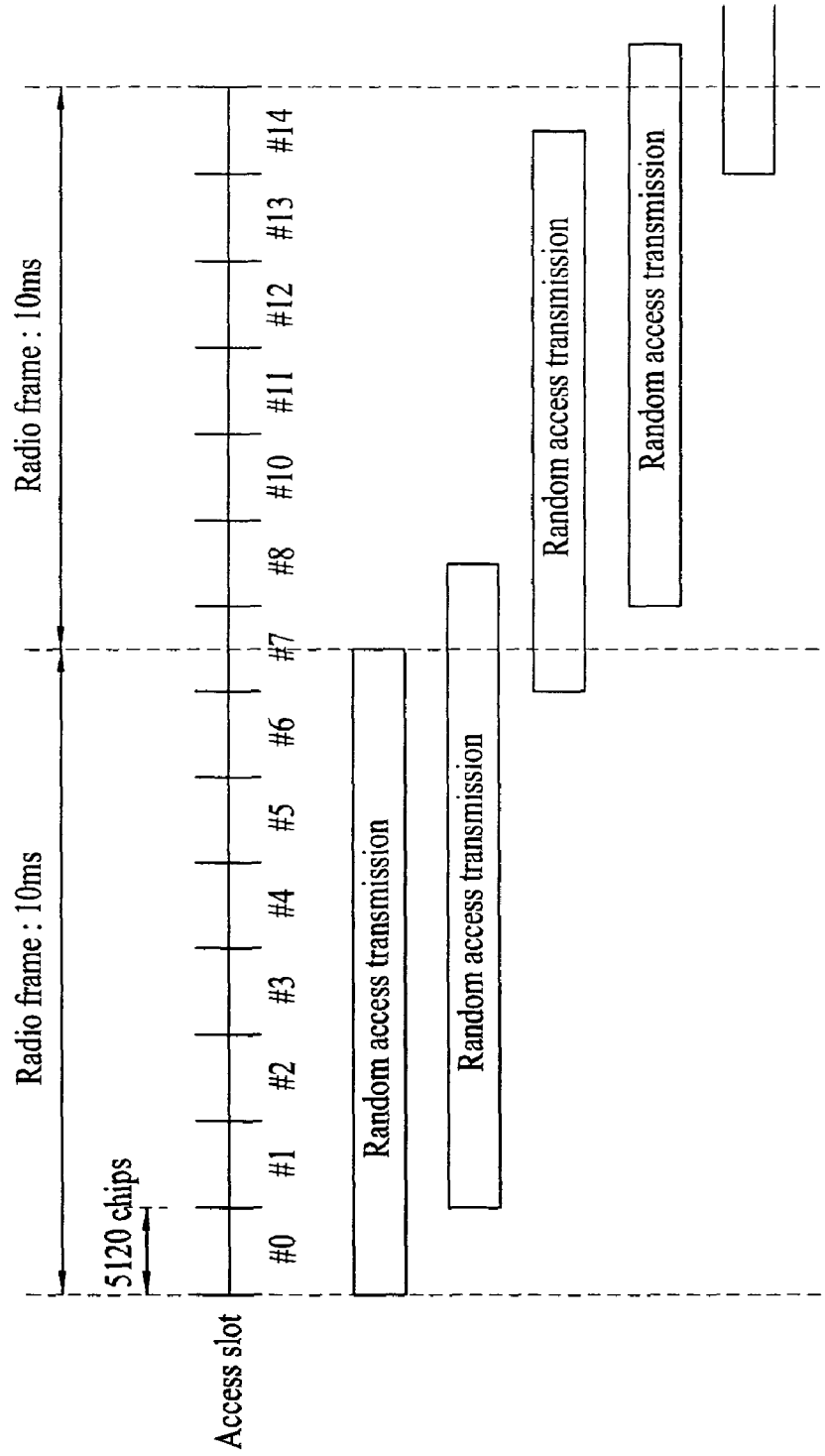
FIG. 7 illustrates the number and spacing of access slots.
Figure 8:
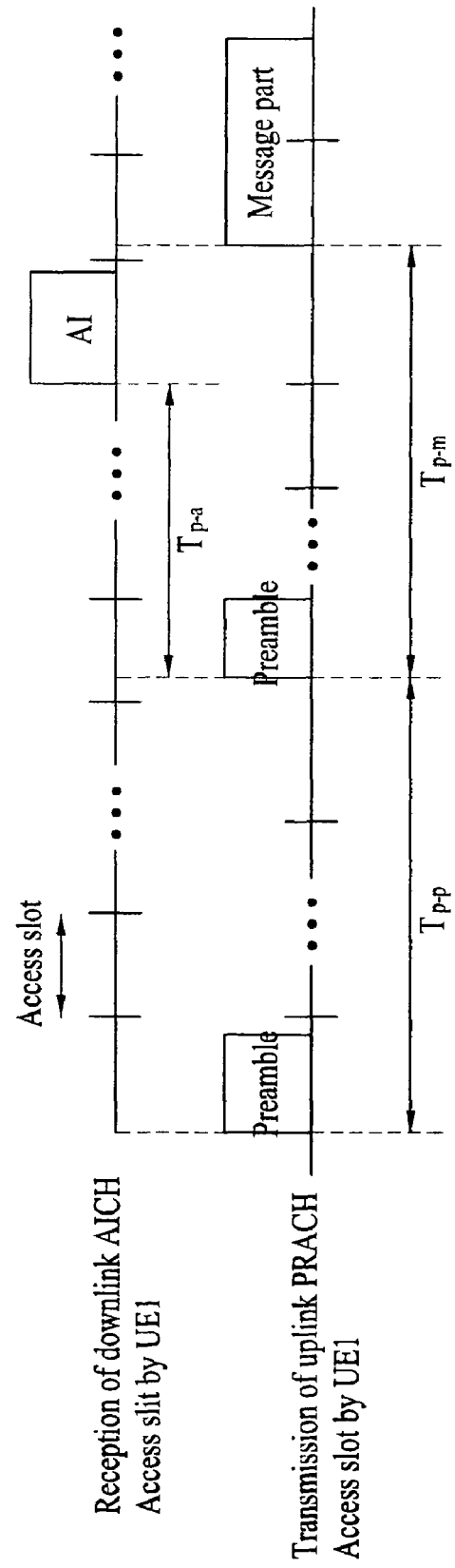
FIG. 8 illustrates the timing of the preamble, Access Indicator and message part.
Figure 9:
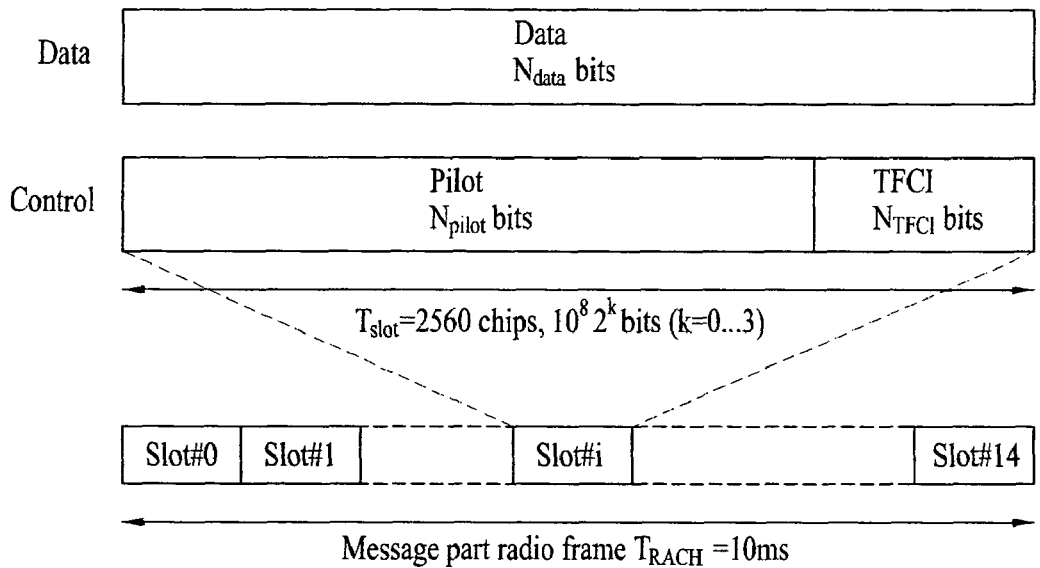
FIG. 9 illustrates the structure of the random access message part.
Figure 10:
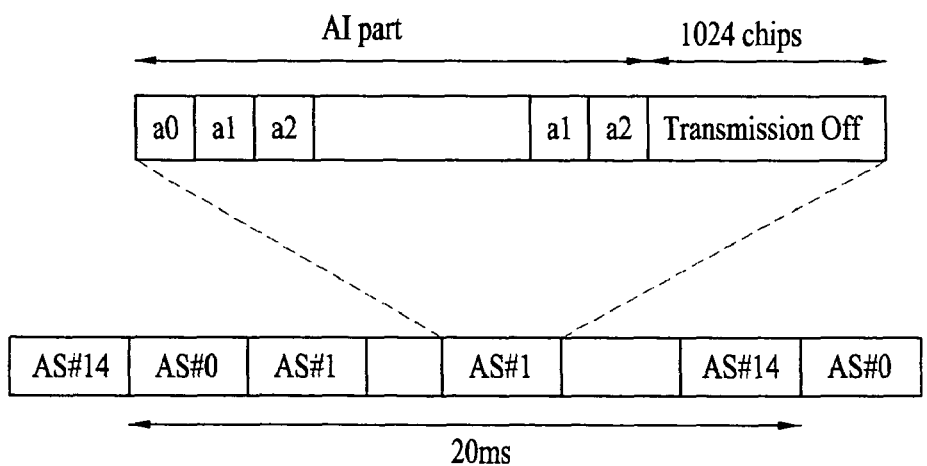
FIG. 10 illustrates the structure of the AICH.
Figure 11:
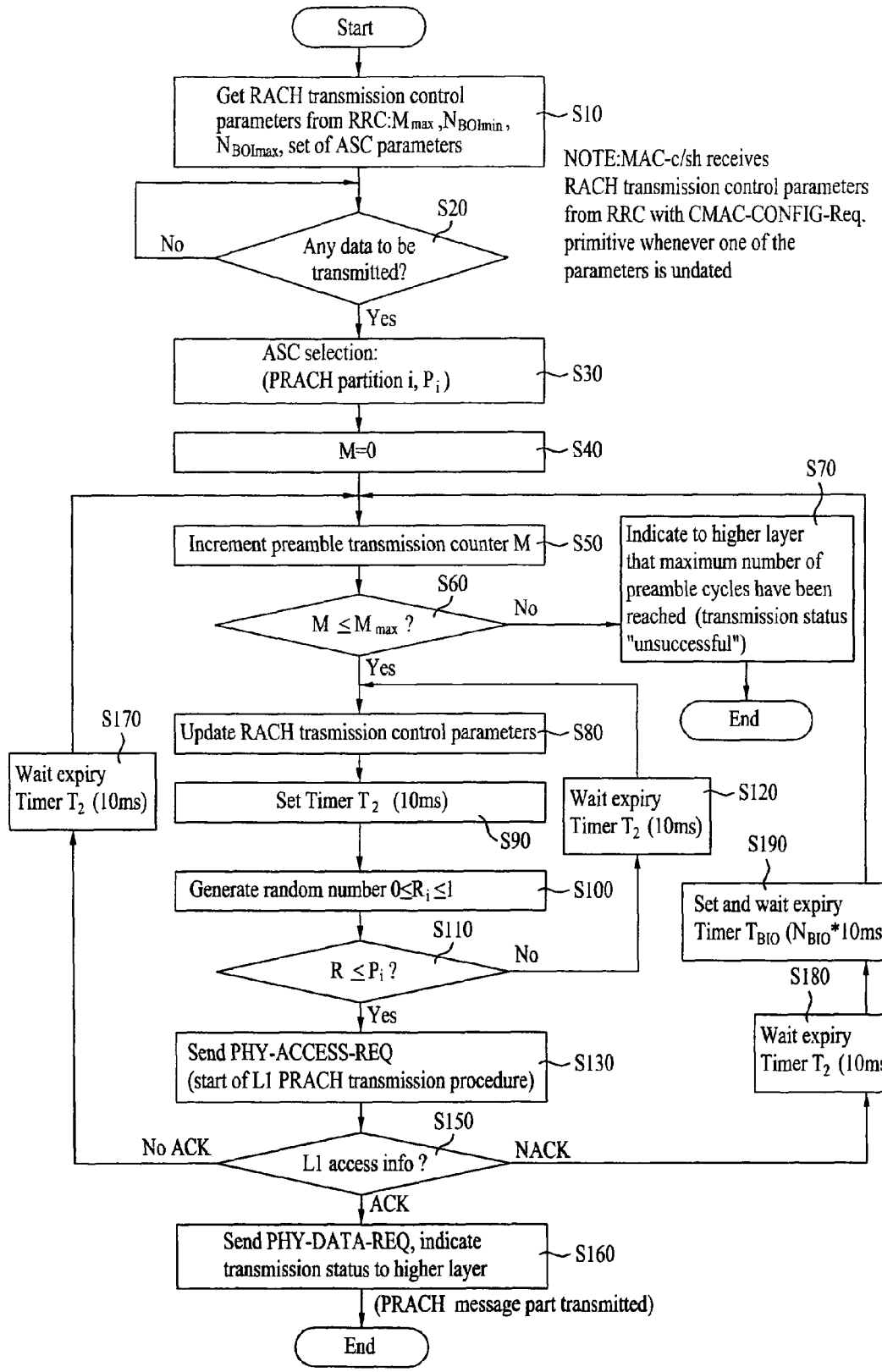
FIG. 11 illustrates a control access procedure.
Figure 12:
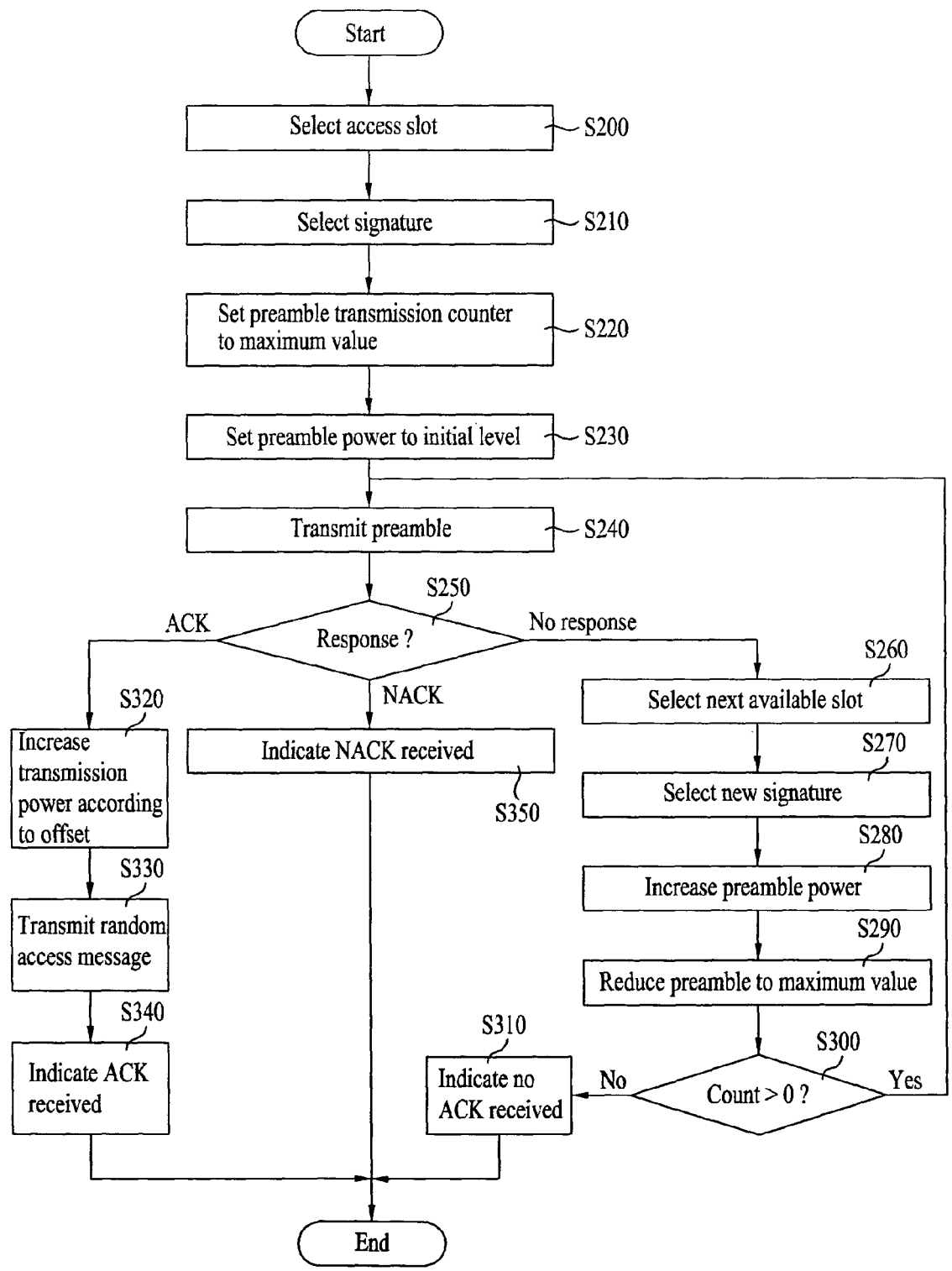
FIG. 12 illustrates a physical layer random-access procedure.
Figure 13:
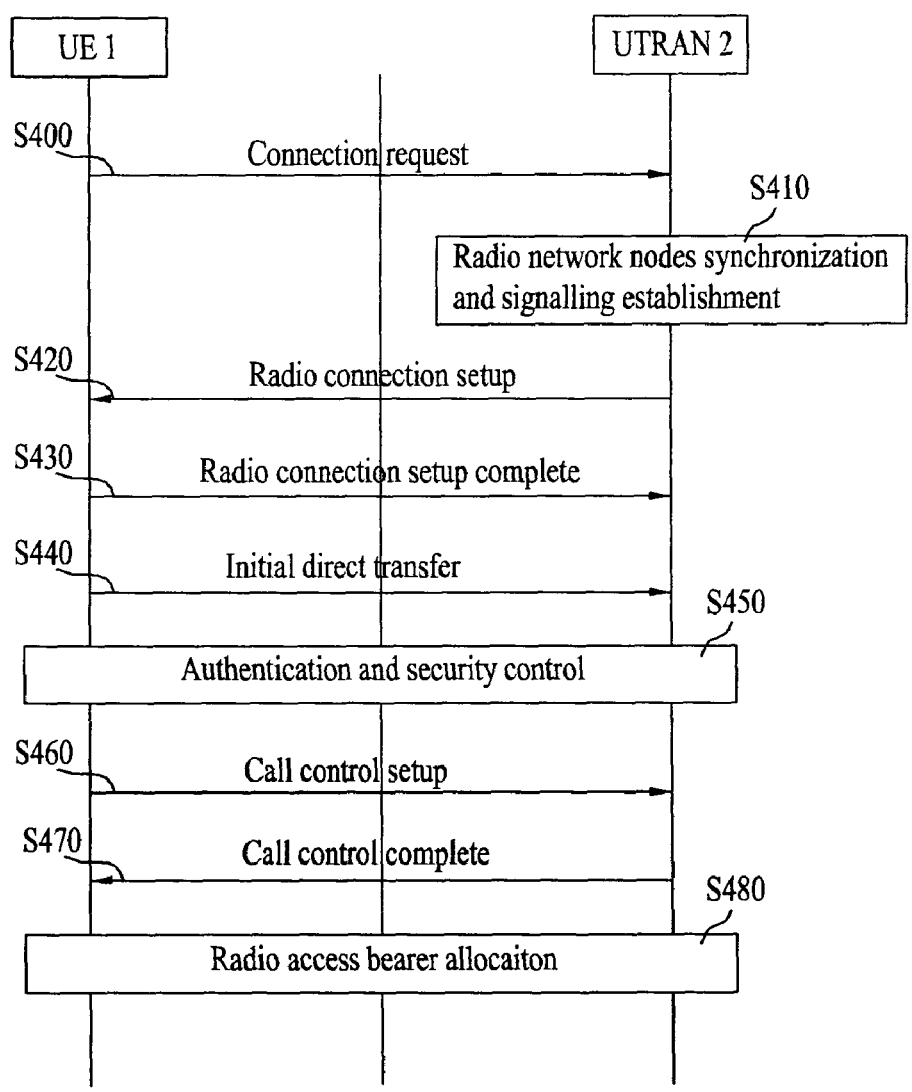
FIG. 13 illustrates a signaling establishment procedure between a UE and network.
Figure 14:
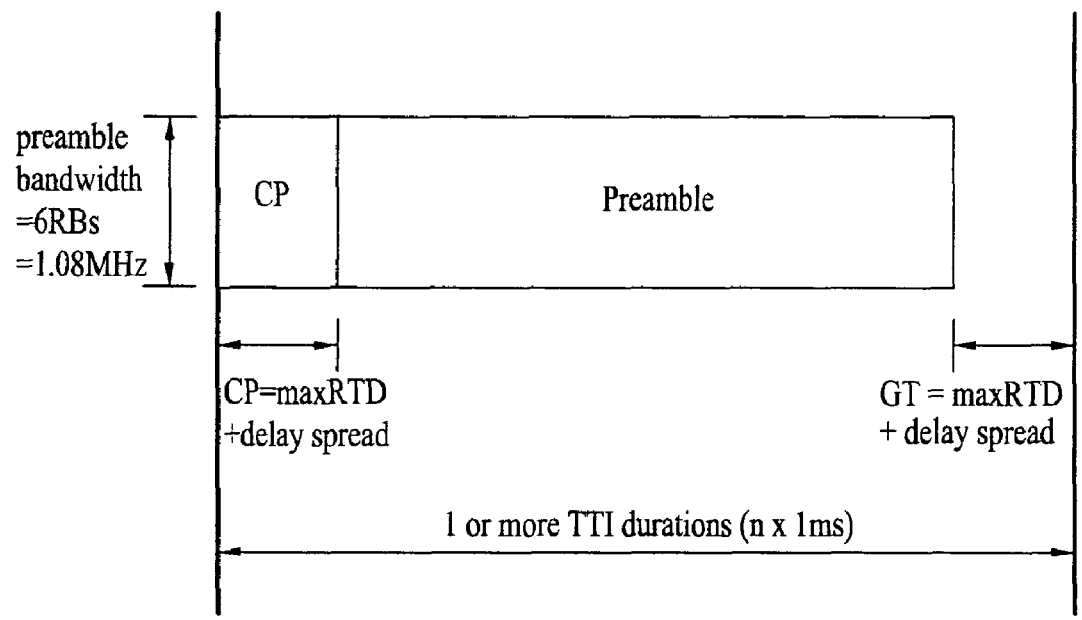
FIG. 14 illustrates a random access burst.
Figure 15:
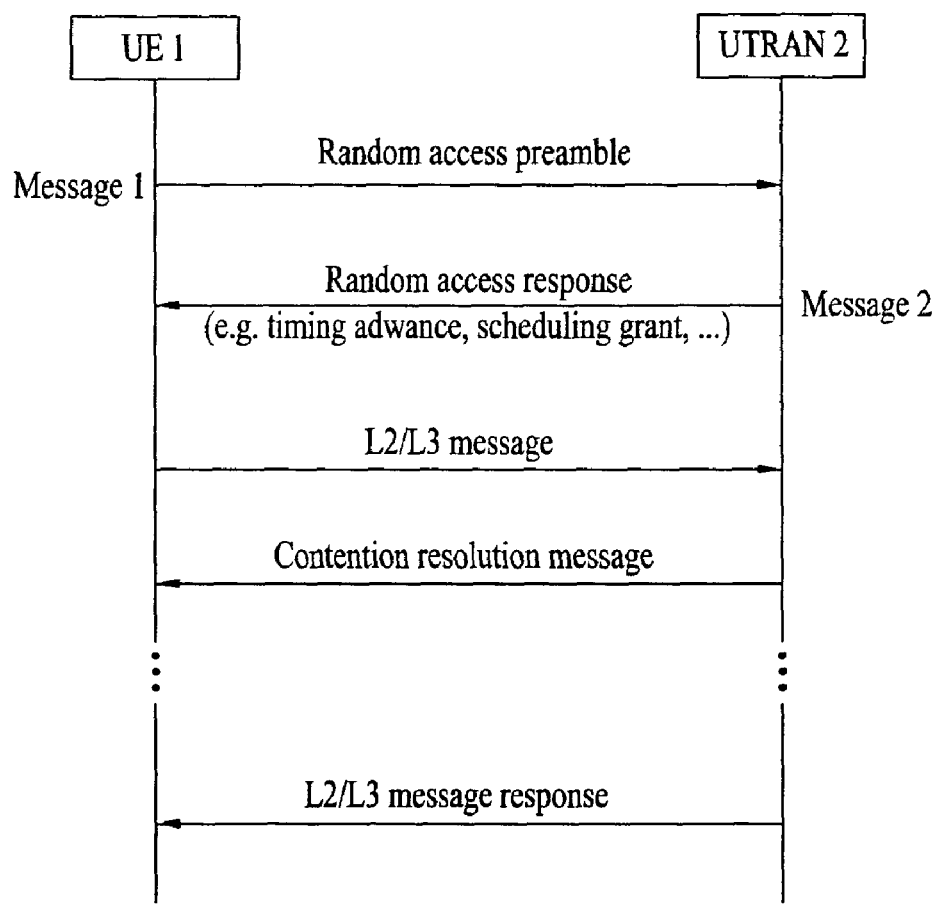
FIG. 15 illustrates a call flow diagram for a non-synchronized physical random access procedure.
Figure 16:
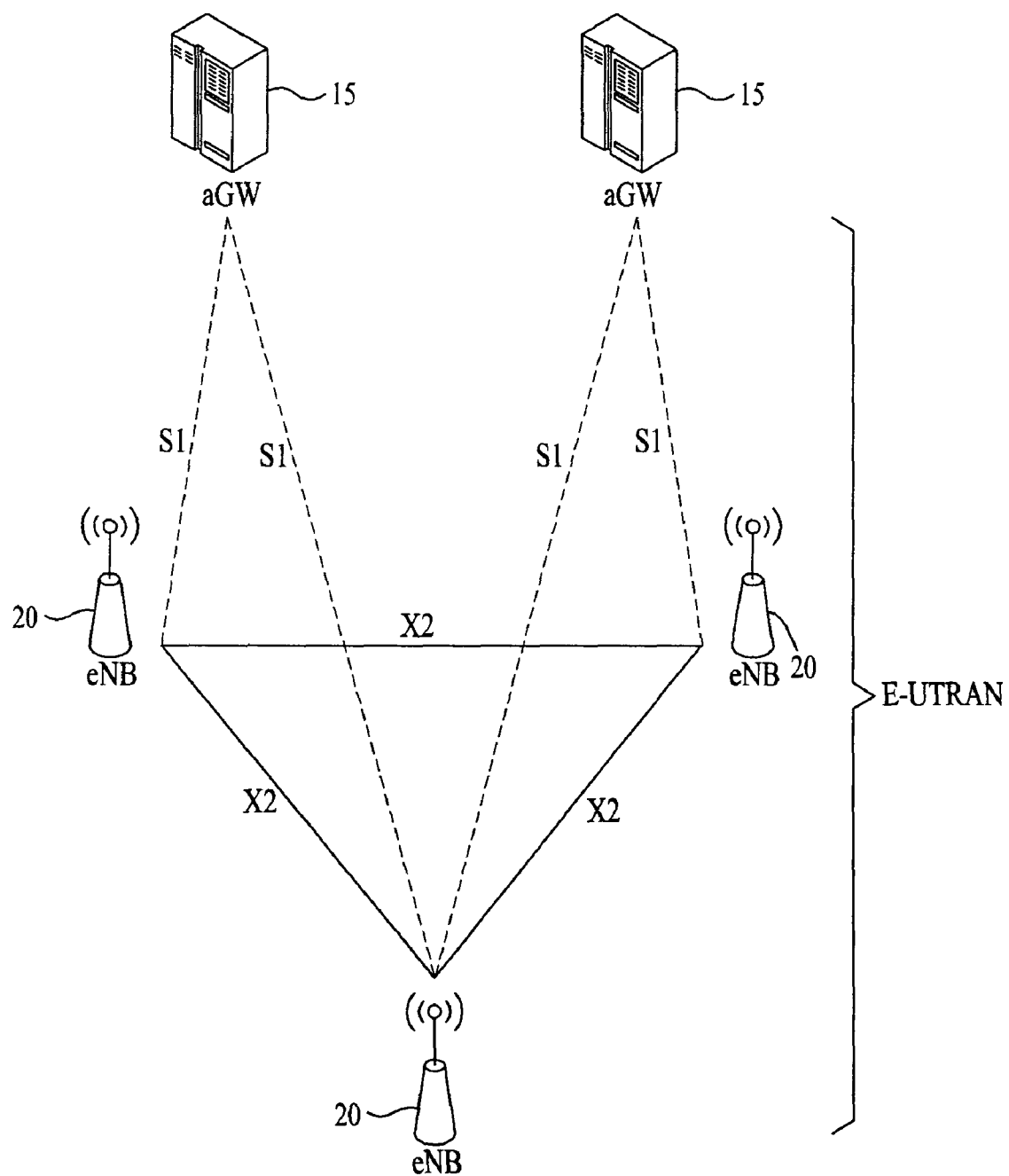
FIG. 16 illustrates the architecture of an LTE system.
Figure 17:
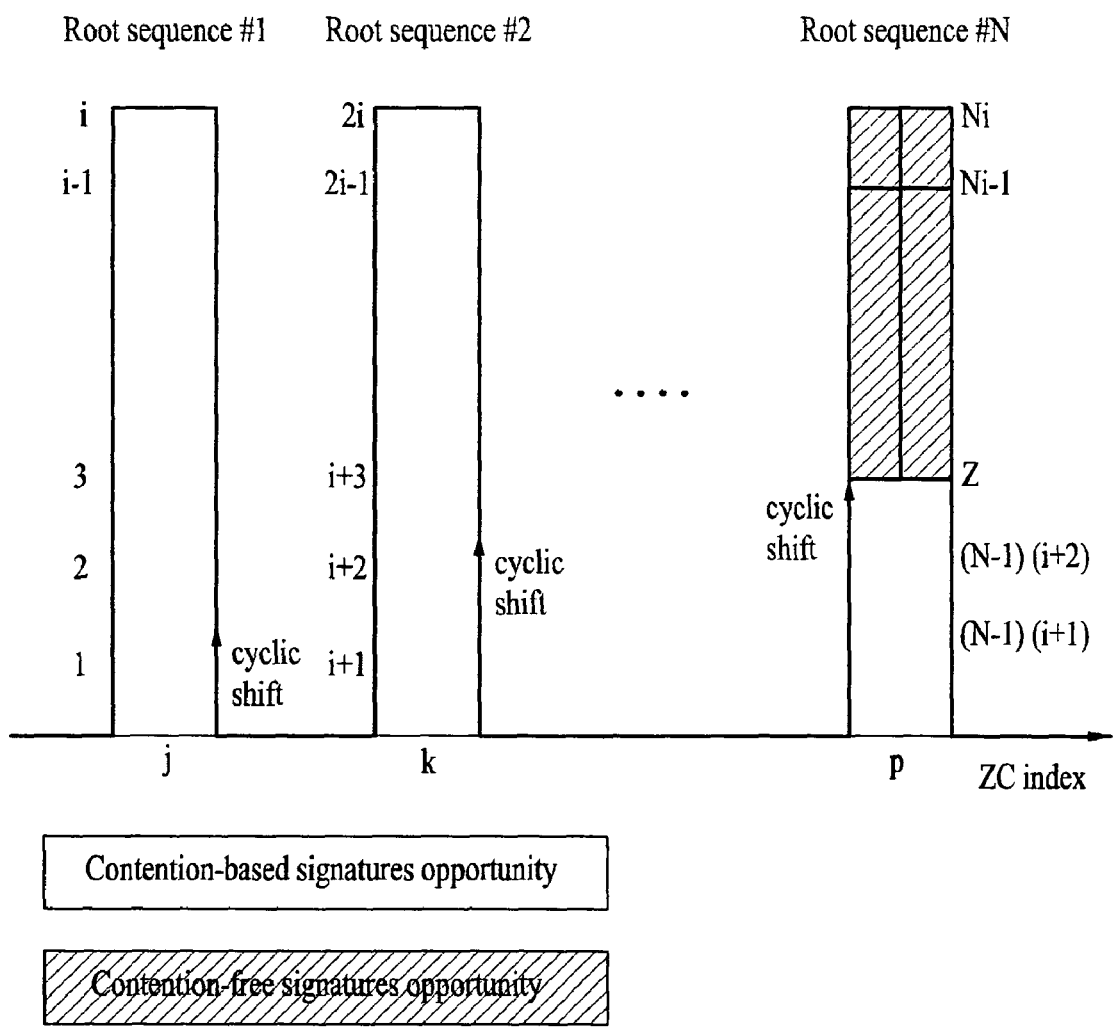
FIG. 17 illustrates a proposed allocation of contention-free signatures onto remaining ZC-ZCZ sequence from contention-based allocation according to a first embodiment of the present invention.

FIG. 17 illustrates a first possible allocation for dedicated resources. As illustrated In FIG. 17, contention-free signatures are allocated from the remaining available sequences that are not allocated to the contention-based signatures.

The cyclic shift value is related to the cell size such that the shift must be larger than the maximum propagation delay for a given cell size. Therefore, the last root sequence index used for contention-based opportunity is not necessarily fully allocated.

Figure 18:
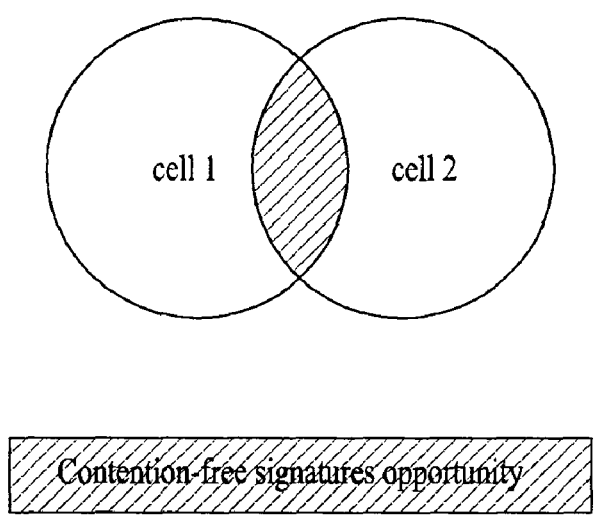
FIG. 18 illustrates dedicated signatures allocated for handover with the same root sequence reused by both cells according to the first embodiment of the present invention.

This provides a benefit in that the remaining sequences of this root index may be allocated for other purposes used by the RACH procedure. As illustrated in FIG. 17, those signatures are allocated for contention-free RACH. Handover or synchronization is more efficient since the same root sequence is reused in both cells when dedicated signatures are allocated, as illustrated in FIG. 18.

It should be noted that additional root indexes may be added to complete the set of dedicated signatures if the remaining contention-free signature opportunity space is not sufficient. This additional index can be either consecutive to the last index, such as index q in FIG. 17 or the next consecutive index to the root index within a list of root indexes provided by the eNB 20. The network can signals only one root index, then the next root index that can be used follow the normal consecutive way. For instance, as in FIG. 17, the last root index is "p" then the next one shall be the root index "q". Another possibility is that the network signals a list of root indexes that should be used, for instance, (a, r, e, z, t). In this case, if the start root index is "a", the next consecutive root index within the list is "r".

The signature opportunities are mapped onto the cyclic shifted ZC sequences (ZC-ZCZ) in consideration of the ZC sequence length defined in the standard, the ZC root sequence index or list of root indexes broadcast by the cell, and a cyclic shift value either broadcast by the cell or determined by the UE 1. First, contention-based signature opportunities are allocated. The allocation is altered once the maximum number of contention-based signatures is reached.

The first signature is allocated from the root index as indicated by the eNB 20 or first ZC root sequence index in the list. The second signature is right-cyclic-shifted by the cyclic shift value and allocated from the same ZC root sequence index. Signatures are similarly incrementally allocated from consecutive right-cyclic-shifted versions of the same ZC root sequence index until all possible 'i' cyclic shifts have been allocated.

The next signature 'i+1' is allocated from the next ZC root sequence index or the next root sequence index in the list), with the following signatures allocated from their consecutive right-cyclic-shifted versions. Allocation of contention-based signature opportunity is repeated over all ZC root sequences index in the list until the maximum number of sequences 'Z' for contention-based RACH defined in the standard are generated.

The first dedicated signature is then right-cyclic-shifted by the cyclic shift value from 'Z' and allocated from the same ZC root sequence index. The next dedicated signatures are incrementally allocated from consecutive right-cyclic-shifted versions of the same ZC root sequence index until all possible cyclic shifts have been allocated or the maximum number of dedicated signatures is reached. The next dedicated signatures are allocated from their consecutive right-cyclic-shifted versions of the next available ZC root sequence indexes or the sequence indexes in the list until the maximum number of dedicated signatures is reached if all possible cyclic shifts have been allocated from the same ZC sequence index but the maximum number of dedicated signatures has not been reached.

The eNB 20 may signal only one index, such as the start root index, rather than broadcasting the list of indexes. The UE 1 and eNB 20 can generate the needed signatures in consideration of the maximum number of contention-based and contention-free signatures and the cyclic shift value such that there is no need to broadcast the signatures from the network.

Figure 19:
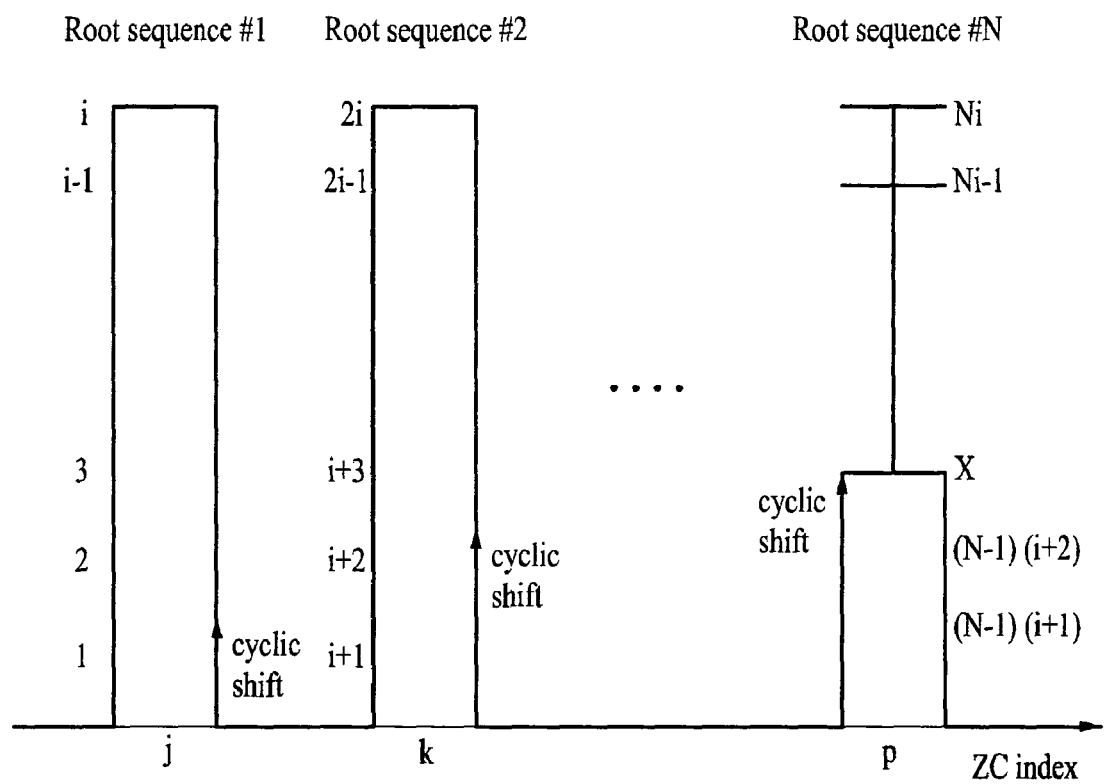
FIG. 19 illustrates using the same root sequences for both allocations of contention-based and contention-free signatures according to a second embodiment of the present invention.

FIG. 19 illustrates a second possible allocation for dedicated resources. As illustrated In FIG. 19, contention-free signatures are allocated from the same sequences that are allocated to the contention-based signatures such that contention-free and contention-based signatures share the same code sequences used and different time/frequency resources for distinction. It is contemplated that any the allocation illustrated in FIG. 19 may be combined with other allocation of the present invention.

Figure 20:
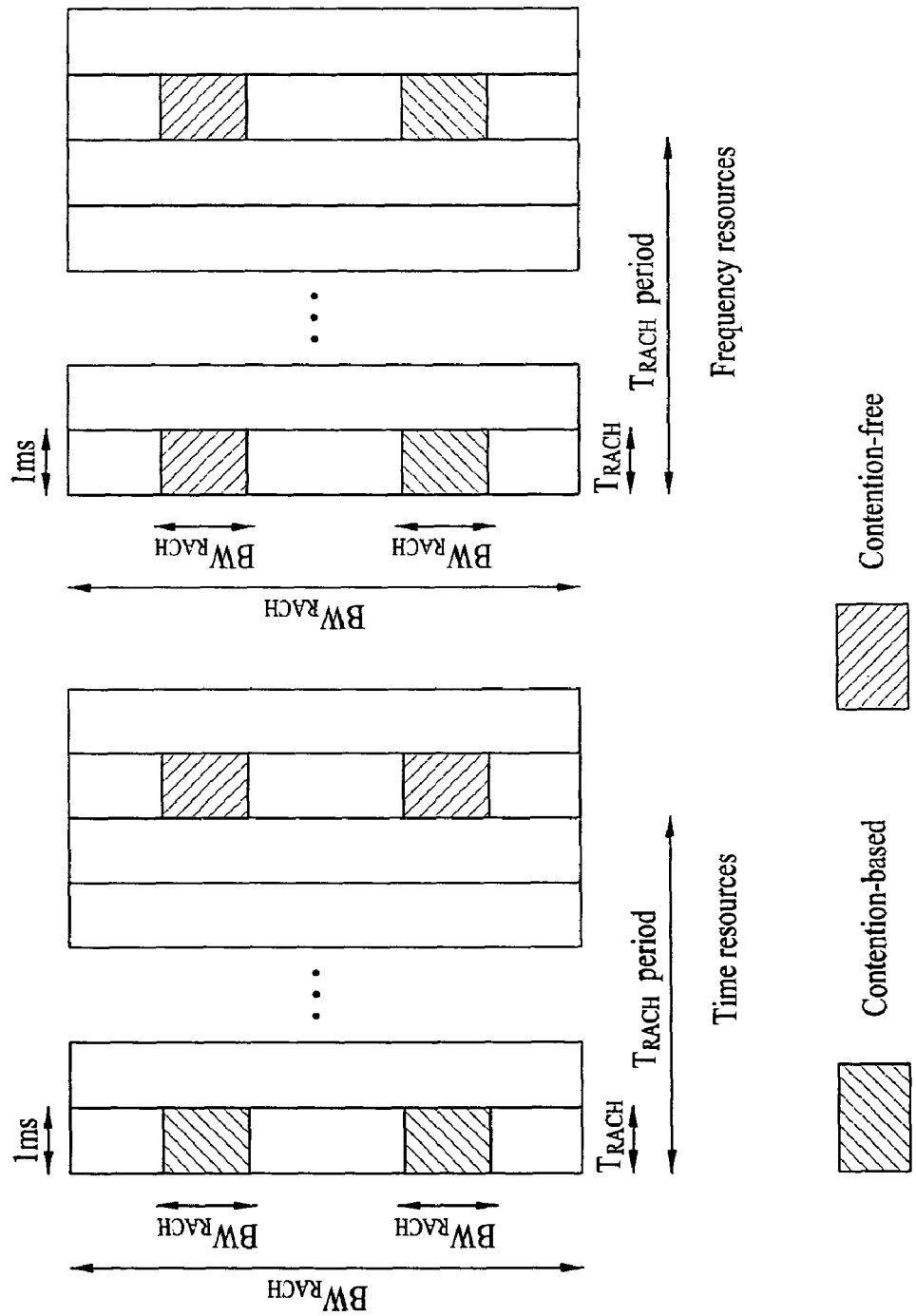
FIG. 20 illustrates time and frequency resources allocation for contention-free and contention-based distinction according to the second embodiment of the present invention.

There is no code sequence distinction between contention-free and contention-based signatures. The distinction is made according to the time/frequency resources used for RACH, as shown in FIG. 20. The eNB 20 informs the UE 1 of the time and frequency allocation.

As illustrated in FIG. 20, multiple frequency regions $BW_{RACH}$ can be defined within one access period $T_{RACH}$. Each frequency region is referred to as a "resource block" and includes 12 subcarriers, with the RACH frequency region, $BW_{RACH}$, using at least 6 of the resource blocks.

The access period $T_{RACH}$ occurs periodically according to the parameter $T_{RACH}$ period. Different $T_{RACH}$ periods between contention free and contention based RACH is not excluded even if additional signaling overhead is required.

There is no difference between the allocation of contention-based signatures and contention-free signatures from a code sequence perspective. As in the first embodiment, the eNB 20 may either indicate the start root index or a list of root indexes for use.

The UE 1 and the eNB 20 each generate available signatures for use according to the cyclic shift value broadcast by the eNB and the maximum contention-based and contention-free signatures broadcast by the eNB. However the eNB 20 must broadcast to the UE 1 an indication of time/frequency resources that may be used for contention-free RACH and which resources may be used for contention-based RACH.

Figure 21:
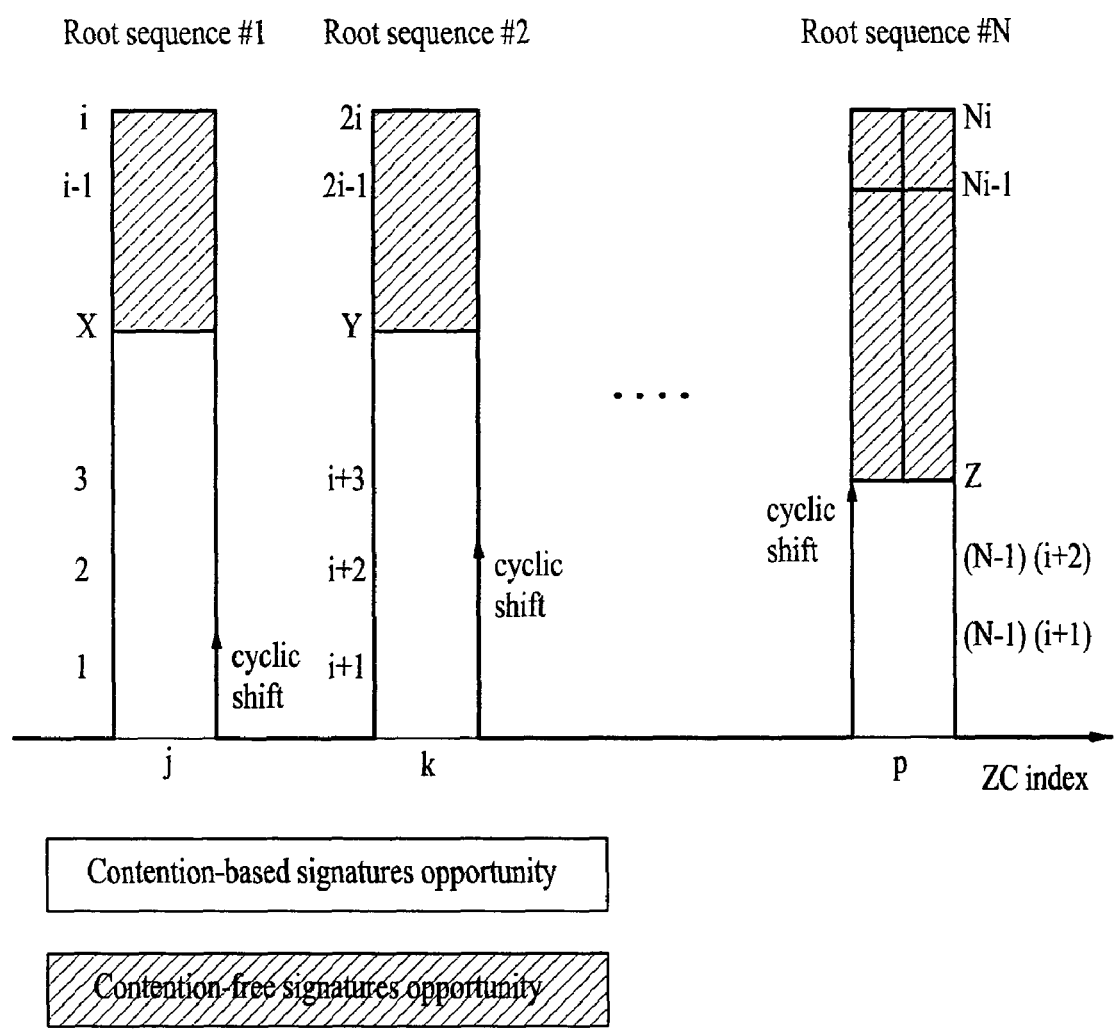
FIG. 21 illustrates root sequence space divided between contention-based and contention-free signatures opportunity according to a third embodiment of the present invention.

FIG. 21 illustrates a third possible allocation for dedicated resources. As illustrated In FIG. 21, contention-free and contention-based signatures are allocated from the same root sequences by dividing the root sequence space between contention-based and contention-free signatures opportunity. However, the division is not necessarily equal. The eNB 20 determines the division of the 64 generated signatures between contention-based and contention-free signatures, with the division not necessarily equal.

Each root sequence can be dedicated for special purposes of contention-free RACH. For example, the Root sequence #1 may be dedicated for scheduling request, Root sequence #2 dedicated for uplink synchronization maintenance and Root sequence #N dedicated for handover.

The eNB 20 must broadcast the separation point or amount of dedicated and random signatures for use for each ZC root sequence index. The allocation of signatures is almost the same as in the first embodiment.

Figure 22:
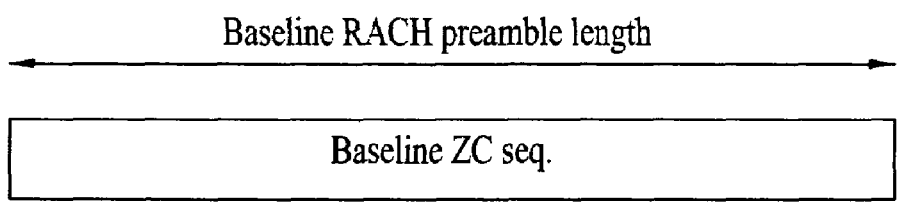
FIG. 22 illustrates baseline ZC sequence length according to a fourth embodiment of the present invention.
Figure 23:
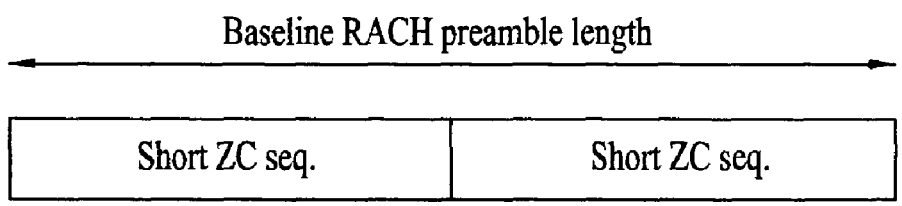
FIG. 23 illustrates two times repetition of shorter ZC sequence structure according to the fourth embodiment of the present invention.
Figure 24:
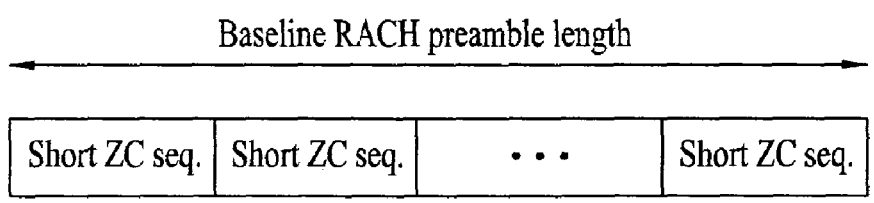
FIG. 24 illustrates N times repetition of Shorter ZC sequence structure according to the fourth embodiment of the present invention.

FIGS. 22-24 illustrate a fourth possible allocation for dedicated resources. As illustrated In FIGS. 22-24, contention-based signatures are allocated from the ZC sequence of the baseline preamble structure while the contention-free signatures are allocated from the ZC sequence of the additional preamble structure.

The contention-free signatures opportunity would be allocated from the shorter ZC sequence while the contention-based signatures would be allocated from the baseline ZC sequence. Any combination of this embodiment with other embodiments disclosed herein is not precluded. For example, the same size ZC sequence, such as a 839-bit ZC sequence is used for contention-based signatures while different size ZC sequences, such as a 419-bit sequence, are used for contention-free signatures.

The number of available sequences is determined by the length of the ZC sequence and the cyclic shift value, which is related to the cell size such that the shift must be larger than the maximum propagation delay for a given cell size. The length of the baseline ZC sequence would be fixed in the applicable standard.

Additional ZC sequence structure can be shorter than the baseline ZC sequence length. For example, the additional ZC sequence structure can be half the baseline sequence length if the total number of sequences are decreased by factor of two and the shorter ZC sequence must be repeated two times to match the baseline preamble length, as illustrated in FIG. 23.

As illustrated in FIG. 24, the additional ZC sequence structure can be N times shorter than the baseline ZC sequence length, thereby requiring N repetitions to match the length of the baseline preamble structure. However N should not be too low since the total number of signature is decreased by factor N. Longer ZC sequence, or repetition of the baseline ZC sequence, is not precluded but undesirable due to additional required RACH overhead that impacts RACH performances, such as RACH latency.

The eNB 20 must broadcast additional structure parameters, such as ZC sequence length, and number of repetition. The allocation of dedicated signatures can be the same as the allocation of random signatures in the first embodiment.

Figure 25:
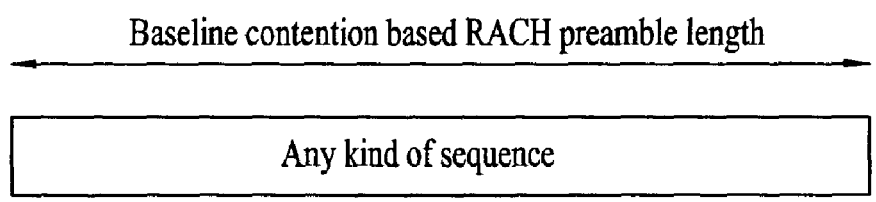
FIG. 25 illustrates contention-free signatures based on any kind of sequences with respect to baseline RACH preamble length according to a fifth embodiment of the present invention.

FIG. 25 illustrates a fifth possible allocation for dedicated resources. As illustrated In FIG. 25, contention-free signatures are allocated from sequences that may not be ZC sequences.

The sequences from which contention-free signatures are allocated may be any type of sequence. For example, the sequences may be another CAZAC sequence, such as GCL or Frank, Pseudo Noise sequence, such as PN, Gold, or Kazami, or Hadmard sequences. The sequences shall be designed in consideration of the baseline RACH preamble length as indicated in the applicable standard for the contention-based signatures.

Figure 26:
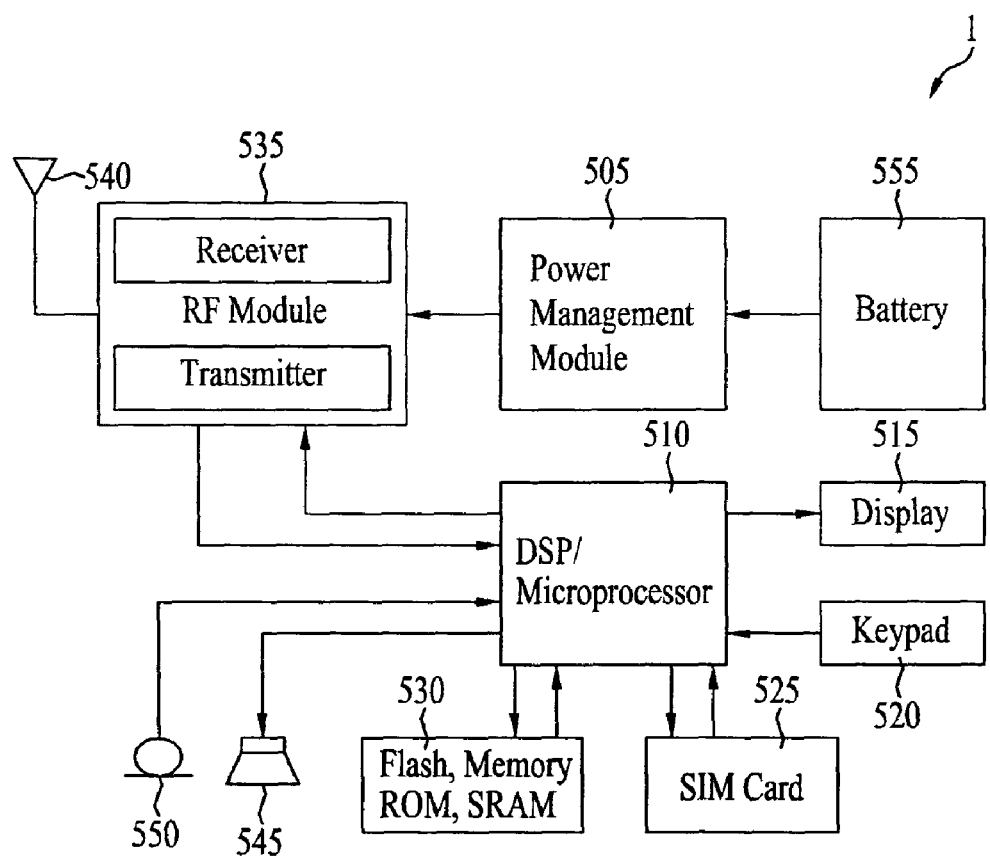
FIG. 26 illustrates a block diagram of a mobile station (MS) or access terminal (AT) according to the present invention.

FIG. 26 illustrates a block diagram of a mobile station (MS) or UE 1. The UE 1 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

[Industrial Applicability]

The present invention is directed to a mobile terminal random access procedure for obtaining uplink time synchronization and access to a network and specifically to an apparatus and method that facilitates optimization for allocation of cyclic shifted ZC-ZCZ as part of dedicated signatures for contention-free uplink radio access channels (RACH). This invention is applicable to an algorithm of a random access process of a mobile communication system, and a user equipment and base station for supporting the same.

The invention claimed is:

1. A method of requesting a random access connection with a base station, at a user equipment (UE) in a wireless system, the method comprising:

receiving information comprising a cyclic shift parameter and at least one signature root sequence index;

selecting one of a plurality of signature sequences, wherein each of the plurality of signature sequences is generated based on the cyclic shift parameter and the at least one signature root sequence index, and the selected one of the plurality of signature sequences is used for requesting contention-based random access to the base station;

receiving a dedicated signature identifier, wherein the dedicated signature identifier represents a signature sequence generated based on the cyclic shift parameter and the at least one signature root sequence index, and the signature sequence is not used in the contention-based random access;

transmitting a preamble for requesting contention-free random access to the base station, the transmitting comprising right-cyclic-shifting a dedicated signature according to the cyclic shift parameter; and transmitting a subsequent preamble for requesting contention-free random access by incrementally allocating the dedicated signature from a right-cyclic-shifted version of a different one of the at least one signature root sequence index if a preset number of cyclic shifts has been performed before a preset maximum number of dedicated signatures has been allocated, wherein:

the preamble comprises the selected one of the plurality of signature sequences for the contention-based random access and the signature sequence represented by the dedicated signature identifier; and the preamble is generated after a preset maximum number of signature sequences for contention-based random access are selected.

2. The method of claim 1, wherein the at least one signature root sequence index of the received information is only one signature root sequence index and the method further comprises:

transmitting the plurality of signature sequences according to a preset maximum number of contention-based signatures, a preset maximum number of contention-free signatures and the cyclic shift parameter.

3. A method of requesting a random access connection with a base station, at a user equipment (UE) in a wireless system, the method comprising:

receiving information comprising a cyclic shift parameter and at least one signature root sequence index;

selecting one of a plurality of signature sequences, wherein each of the plurality of signature sequences is generated based on the cyclic shift parameter and the at least one signature root sequence index, and the selected one of the plurality of signature sequences is used for requesting contention-based random access to the base station;

receiving a dedicated signature identifier, wherein the dedicated signature identifier represents a signature sequence generated based on the cyclic shift parameter and the at least one signature root sequence index;

transmitting a preamble for requesting contention-free random access to the base station, the transmitting comprising right-cyclic-shifting a dedicated signature according to the cyclic shift parameter; and transmitting a subsequent preamble for requesting contention-free random access by incrementally allocating the dedicated signature from a right-cyclic-shifted version of a different one of the at least one signature root sequence index if a preset number of cyclic shifts has been performed before a preset maximum number of dedicated signatures has been allocated, wherein:

the preamble comprises the selected one of the plurality of signature sequences for the contention-based random access and the signature sequence represented by the dedicated signature identifier; and the preamble is generated after a preset maximum number of signature sequences for contention-based random access are selected.

4. The method of claim 3, wherein the at least one signature root sequence index of the received information is only one signature root sequence index and the method further comprises:

transmitting the plurality of signature sequences according to a preset maximum number of contention-based signatures, a preset maximum number of contention-free signatures and the cyclic shift parameter.

5. A user equipment (UE) for requesting a random access connection with a base station in a wireless system, the UE comprising:

a transmitting/receiving unit configured to transmit a message to the base station and receive a message from the base station;

a display unit configured to display user interface information;

an input unit configured to receive inputs from a user; and a processing unit configured to:

receive information comprising a cyclic shift parameter and at least one signature root sequence index;

select one of a plurality of signature sequences;

receive a dedicated signature identifier;

transmit a preamble for requesting contention-free random access to the base station, the transmitting the preamble comprising right-cyclic-shifting a dedicated signature according to the cyclic shift parameter; and generate a subsequent preamble for requesting contention-free random access by incrementally allocating the dedicated signature from a right-cyclic-shifted version of a different one of the at least one signature root sequence index if a preset number of cyclic shifts has been performed before a preset maximum number of dedicated signatures has been allocated, wherein:

each of the plurality of signature sequences is generated based on the cyclic shift parameter and the at least one signature root sequence index;

the selected one of the plurality of signature sequences is used for requesting contention-based random access to the base station;

the dedicated signature identifier represents a signature sequence generated based on the cyclic shift parameter and the at least one signature root sequence index;

the preamble comprises the selected one of the plurality of signature sequences for the contention-based random access and the signature sequence represented by the dedicated signature identifier; and the preamble is generated after a preset maximum number of signature sequences for contention-based random access are selected.

6. The UE of claim 5, wherein the at least one signature root sequence index of the received information is only one signature root sequence index and the processing unit is further configured to generate the plurality of signature sequences according to a preset maximum number of contention-based signatures, a preset maximum number of contention-free signatures and the cyclic shift parameter.

* * * * *